(12) United States Patent
Naylor et al.

(10) Patent No.: US 8,952,301 B2
(45) Date of Patent: *Feb. 10, 2015

(54) MODULAR HEATED COVER

(75) Inventors: David Naylor, Draper, UT (US); Thomas Caterina, Boise, ID (US)

(73) Assignee: 417 and 7/8, LLC, Park City, UT (US)

( * ) Notice: Subject to any disclaimer, the term of this patent is extended or adjusted under 35 U.S.C. 154(b) by 1102 days.

This patent is subject to a terminal disclaimer.

(21) Appl. No.: 12/264,460

(22) Filed: Nov. 4, 2008

(65) Prior Publication Data

US 2009/0127251 A1 May 21, 2009

Related U.S. Application Data

(63) Continuation of application No. 12/212,529, filed on Sep. 17, 2008, which is a continuation-in-part of application No. 11/835,641, filed on Aug. 8, 2007, now abandoned, which is a continuation-in-part of (Continued)

(51) Int. Cl.
*H05B 3/50* (2006.01)
*E01C 11/26* (2006.01)

(Continued)

(52) U.S. Cl.
CPC .............. *E01C 11/265* (2013.01); *A01G 13/06* (2013.01); *E01C 23/03* (2013.01); *H05B 1/0275* (2013.01); *H05B 3/36* (2013.01); *F24D 13/022* (2013.01);

(Continued)

(58) Field of Classification Search
USPC ......... 219/200, 213, 476, 480, 528, 548, 543, 219/544, 552, 549; 392/432, 435, 436, 346; 428/174, 210, 332, 336, 408, 446
See application file for complete search history.

(56) References Cited

U.S. PATENT DOCUMENTS

| 1,455,287 | A | 5/1923 | Hadley |
| 1,486,412 | A | 3/1924 | Biddlecom |

(Continued)

FOREIGN PATENT DOCUMENTS

| GB | 1387409 | 3/1975 |
| JP | 04350257 | 12/1992 |

(Continued)

OTHER PUBLICATIONS

U.S. Appl. No. 12/258,249, filed Oct. 24, 2008, Naylor.

(Continued)

*Primary Examiner* — Thien S Tran
(74) *Attorney, Agent, or Firm* — Workman Nydegger

(57) ABSTRACT

The grounded modular heated cover is disclosed with a first pliable outer layer and a second pliable outer layer, an electrical heating element between the first and the second outer layers, a heat spreading layer, and a thermal insulation layer positioned above the active electrical heating element. Beneficially, such a device provides radiant heat, weather isolation, temperature insulation, and solar heat absorption efficiently and cost effectively. The modular heated cover quickly and efficiently removes ice, snow, and frost from surfaces, and penetrates soil and other material to thaw the material to a suitable depth. A plurality of modular heated covers can be connected on a single 120 Volt circuit protected by a 20 Amp breaker. The modular heated covers are grounded for safety using the conductive heat spreading layer.

29 Claims, 12 Drawing Sheets

Related U.S. Application Data application No. 11/744,163, filed on May 3, 2007, now abandoned, application No. 12/264,460, which is a continuation-in-part of application No. 11/422,580, filed on Jun. 6, 2006, now Pat. No. 7,880,121, and a continuation-in-part of application No. 11/218,156, filed on Sep. 1, 2005, now Pat. No. 7,230,213, said application No. 11/422,580 is a continuation-in-part of application No. 11/344,830, filed on Feb. 1, 2006, now Pat. No. 7,183,524.

(60) Provisional application No. 60/688,146, filed on Jun. 6, 2005, provisional application No. 60/654,702, filed on Feb. 17, 2005, provisional application No. 60/656,060, filed on Feb. 23, 2005, provisional application No. 60/688,146, filed on Jun. 6, 2005, provisional application No. 60/654,702, filed on Feb. 17, 2005, provisional application No. 60/656,060, filed on Feb. 23, 2005, provisional application No. 60/688,146, filed on Jun. 6, 2005.

(51) Int. Cl.
*A01G 13/06* (2006.01)
*E01C 23/03* (2006.01)
*H05B 1/02* (2006.01)
*H05B 3/36* (2006.01)
*F24D 13/02* (2006.01)

(52) U.S. Cl.
CPC ..... *H05B 2203/004* (2013.01); *H05B 2203/017* (2013.01); *H05B 2203/026* (2013.01); *H05B 2203/032* (2013.01)
USPC ............ 219/548; 219/213; 219/543; 219/432

(56) References Cited

U.S. PATENT DOCUMENTS

| | | |
|---|---|---|
| 2,666,840 A | 1/1954 | Poirier |
| 2,717,766 A | 9/1955 | Becker |
| 2,745,942 A | 5/1956 | Cohen |
| 3,417,229 A | 12/1968 | Shomphe |
| 3,438,069 A | 4/1969 | Long |
| 3,510,547 A | 5/1970 | Eisler |
| 3,516,485 A | 6/1970 | Mackay et al. |
| 3,649,725 A | 3/1972 | Olson |
| 3,659,077 A | 4/1972 | Olson |
| 3,662,512 A | 5/1972 | Zelnick |
| 3,691,343 A | 9/1972 | Norman |
| 3,694,622 A | 9/1972 | Bentley |
| 3,723,708 A | 3/1973 | Tulkoff |
| 3,729,614 A | 4/1973 | Martinet |
| 3,782,628 A | 1/1974 | Beaudet |
| 3,812,320 A | 5/1974 | Borgren |
| 3,852,569 A | 12/1974 | Potvin |
| 3,865,825 A | 2/1975 | Hirayama |
| 3,881,091 A | 4/1975 | Day |
| 3,896,288 A | 7/1975 | Tulkoff |
| 3,897,928 A | 8/1975 | Eisler |
| 3,938,431 A | 2/1976 | Potvin |
| 3,968,348 A | 7/1976 | Stanfield |
| 4,000,815 A | 1/1977 | Wingbro et al. |
| 4,060,710 A | 11/1977 | Reuter |
| 4,238,105 A | 12/1980 | West |
| 4,244,411 A | 1/1981 | Karlstrom et al. |
| 4,250,397 A * | 2/1981 | Gray et al. .................... 392/435 |
| 4,250,398 A | 2/1981 | Ellis |
| 4,303,074 A | 12/1981 | Bender |
| 4,316,080 A | 2/1982 | Wroblewski |
| 4,401,880 A | 8/1983 | Eizenhoefer |
| 4,423,694 A | 1/1984 | Senneville |
| 4,457,491 A | 7/1984 | Dudman |
| 4,485,297 A * | 11/1984 | Grise et al. .................... 219/528 |
| 4,535,222 A | 8/1985 | Moen |
| 4,542,282 A | 9/1985 | Brasky |
| 4,607,154 A | 8/1986 | Mills |
| 4,625,394 A | 12/1986 | Kemnitz |
| 4,773,105 A | 9/1988 | Toyoshima |
| 4,810,859 A | 3/1989 | Anabtawi |
| 4,832,881 A | 5/1989 | Arnold |
| 4,855,573 A | 8/1989 | Vercillo |
| 4,899,031 A | 2/1990 | Dyer |
| 4,901,266 A | 2/1990 | Takagi |
| 4,919,270 A | 4/1990 | Govang et al. |
| 4,931,627 A | 6/1990 | Watts |
| 4,935,602 A | 6/1990 | Bravo |
| 4,967,057 A * | 10/1990 | Bayless et al. ................. 219/213 |
| 5,049,724 A | 9/1991 | Anderson |
| 5,181,006 A | 1/1993 | Shafe |
| 5,198,063 A | 3/1993 | Howard |
| 5,201,868 A | 4/1993 | Johnson |
| 5,309,981 A | 5/1994 | Binder |
| 5,371,340 A | 12/1994 | Stanfield |
| 5,397,875 A | 3/1995 | Bechtold |
| 5,451,747 A | 9/1995 | Sullivan |
| 5,499,621 A | 3/1996 | Trihey |
| 5,550,350 A | 8/1996 | Barnes |
| 5,557,704 A | 9/1996 | Dennis et al. |
| 5,590,478 A | 1/1997 | Furness |
| 5,591,365 A * | 1/1997 | Shields ......................... 219/213 |
| 5,601,143 A | 2/1997 | Binder |
| 5,601,232 A | 2/1997 | Greenlee |
| 5,614,292 A | 3/1997 | Saylor |
| 5,669,221 A | 9/1997 | LeBleu |
| 5,704,487 A | 1/1998 | Taravella et al. |
| 5,780,367 A | 7/1998 | Handwerker |
| 5,824,996 A | 10/1998 | Kochman |
| 5,827,050 A | 10/1998 | Price |
| 5,830,809 A | 11/1998 | Howard |
| 5,854,470 A | 12/1998 | Silva |
| 5,974,820 A | 11/1999 | Boyd |
| 5,990,454 A | 11/1999 | Westerberg |
| 5,994,669 A | 11/1999 | McCall |
| 6,051,811 A * | 4/2000 | Hardison ...................... 219/213 |
| 6,051,812 A | 4/2000 | Walker |
| 6,057,530 A | 5/2000 | Gurevich |
| 6,180,929 B1 | 1/2001 | Pearce |
| 6,184,496 B1 | 2/2001 | Pearce |
| 6,189,487 B1 * | 2/2001 | Owen et al. ................... 119/28.5 |
| 6,211,493 B1 | 4/2001 | Bouman |
| 6,222,160 B1 | 4/2001 | Remke |
| 6,245,400 B1 | 6/2001 | Tzeng |
| 6,279,856 B1 | 8/2001 | Rutherford |
| 6,294,761 B1 | 9/2001 | Diederich |
| 6,294,768 B1 | 9/2001 | Liebich |
| 6,303,905 B1 | 10/2001 | Chiles |
| 6,330,986 B1 | 12/2001 | Rutherford et al. |
| 6,392,209 B1 | 5/2002 | Oppitz |
| 6,426,488 B2 | 7/2002 | Schielke |
| 6,426,489 B1 | 7/2002 | Elsasser |
| 6,432,336 B1 | 8/2002 | Mercuri |
| 6,452,138 B1 | 9/2002 | Kochman |
| 6,482,520 B1 | 11/2002 | Tzeng |
| 6,483,087 B2 | 11/2002 | Gardner |
| 6,503,626 B1 | 1/2003 | Norley |
| 6,614,992 B2 | 9/2003 | Schmitt |
| 6,631,603 B2 | 10/2003 | Zornes |
| 6,657,170 B2 | 12/2003 | Clothier |
| 6,664,520 B2 | 12/2003 | Clothier |
| 6,667,100 B2 * | 12/2003 | Rutherford et al. ........... 428/408 |
| 6,673,284 B2 | 1/2004 | Mercuri |
| 6,673,289 B2 | 1/2004 | Reynolds |
| 6,740,381 B2 | 5/2004 | Day |
| 6,746,768 B2 | 6/2004 | Greinke |
| 6,782,640 B2 | 8/2004 | Westin |
| 6,797,251 B1 | 9/2004 | Bennett |
| 6,822,198 B2 | 11/2004 | Rix |
| 6,841,250 B2 | 1/2005 | Tzeng |
| 6,841,757 B2 | 1/2005 | Marega et al. |
| 6,848,200 B1 | 2/2005 | Westin |
| 6,855,915 B2 | 2/2005 | Gehring |
| 6,886,233 B2 | 5/2005 | Rutherford |

(56) References Cited

U.S. PATENT DOCUMENTS

| | | | |
|---|---|---|---|
| 6,897,417 B1 | 5/2005 | Usselman | |
| 6,931,756 B2 | 8/2005 | Morgan | |
| 6,943,320 B1 | 9/2005 | Bavett | |
| 6,982,874 B2 | 1/2006 | Smalc | |
| 7,049,559 B2 | 5/2006 | Ishii | |
| 7,108,055 B2 | 9/2006 | Krassowski | |
| 7,161,809 B2 | 1/2007 | Ford | |
| 7,166,912 B2 | 1/2007 | Tzeng | |
| 7,183,524 B2 | 2/2007 | Naylor | |
| 7,186,309 B2 | 3/2007 | Mercuri | |
| 7,230,213 B2 | 6/2007 | Naylor | |
| 7,232,601 B2 | 6/2007 | Mercuri | |
| 7,285,748 B2 | 10/2007 | Nelson et al. | |
| 7,393,577 B2 | 7/2008 | Day | |
| 7,393,587 B2 | 7/2008 | Krassowski | |
| 7,975,879 B2 | 7/2011 | Groesbeck | |
| 2001/0031350 A1 | 10/2001 | Day et al. | |
| 2002/0069603 A1 | 6/2002 | Zornes | |
| 2002/0164483 A1 | 11/2002 | Mercuri | |
| 2003/0046831 A1 | 3/2003 | Westin | |
| 2003/0080114 A1 | 5/2003 | Harashima | |
| 2003/0085215 A1 | 5/2003 | Rix | |
| 2003/0097763 A1 | 5/2003 | Morgan | |
| 2003/0154736 A1 | 8/2003 | Lloyd | |
| 2003/0155347 A1 | 8/2003 | Oh et al. | |
| 2003/0164361 A1 | 9/2003 | Marega et al. | |
| 2004/0004066 A1 | 1/2004 | Evans | |
| 2004/0025784 A1 | 2/2004 | Kawamura | |
| 2004/0035853 A1* | 2/2004 | Pais | 219/548 |
| 2004/0221529 A1 | 11/2004 | Zornes | |
| 2004/0226309 A1 | 11/2004 | Broussard | |
| 2005/0074593 A1 | 4/2005 | Day et al. | |
| 2005/0160620 A1 | 7/2005 | Morgan | |
| 2006/0191902 A1 | 8/2006 | Naylor | |
| 2006/0191903 A1 | 8/2006 | Naylor et al. | |
| 2006/0289000 A1 | 12/2006 | Naylor | |
| 2006/0289468 A1 | 12/2006 | Seibert et al. | |
| 2007/0181561 A1 | 8/2007 | Turletes | |
| 2007/0262073 A1 | 11/2007 | Naylor | |
| 2008/0277417 A1 | 11/2008 | Groesbeck | |
| 2009/0101305 A1 | 4/2009 | Clark | |
| 2009/0302027 A1 | 5/2009 | Caterina | |
| 2009/0302023 A1 | 12/2009 | Caterina | |
| 2011/0006080 A1 | 1/2011 | Naylor | |
| 2011/0174802 A1 | 7/2011 | Naylor | |
| 2011/0266287 A1 | 11/2011 | Groesbeck | |
| 2012/0328274 A1 | 12/2012 | Naylor | |
| 2013/0001217 A1 | 1/2013 | Naylor | |

FOREIGN PATENT DOCUMENTS

| JP | 2001123667 | 5/2001 |
|---|---|---|
| JP | 06129095 | 5/2004 |

OTHER PUBLICATIONS

U.S. Appl. No. 11/835,641, filed Aug. 8, 2007, Naylor.
U.S. Appl. No. 12/212,529, filed Sep. 17, 2008, Caterina.
U.S. Appl. No. 12/119,434, filed May 12, 2008, Caterina.
U.S. Appl. No. 12/258,240, filed Oct. 24, 2008, Caterina.
U.S. Appl. No. 12/264,469, filed Nov. 4, 2008, Naylor.
U.S. Appl. No. 12/264,480, filed Nov. 4, 2008, Naylor.
U.S. Appl. No. 12/264,493, filed Nov. 4, 2008, Naylor.
U.S. Appl. No. 12/260,021, filed Oct. 28, 2008, Naylor.
"Thawzall Heater" http://www.themachinecompany.com/faq.htm.
"Q Foil Performance" http://www.rotabolt.com.html/qfoil_1.html.
"Q Foil Technology" http://www.rotabolt.com.html/qfoil.html.
"Q Foil Product Features" http://www.rotabolt.com.html/qfoil_2.html.
"Thawzall Product Selection" http://www.themachinecompany.com/products.htm.
"Ground Heaters S3000" http://www.groundheaters.com/s3000.htm.
"How it Works" http://www.groundheaters.com/how_it_works.htm.
"FP Parallel Constant Watt Heating Cable" Thermon Manufacturing Co.
"SCS Concrete Curing Blankets" http://www.scsincorporated.com/curingblankets.htm.
"Mauritzon Concrete Curing Blankets" http://www.mauritzononline.com.concretecure.html.
"Concrete-Curing-Blankets.Com" http://concrete-curing-blankets.com.
"Janell Concrete Curing Methods" http://www.janell.com/engineering_data.html.
"GrafTech Material Safety Data Sheet" May 17, 2005.
Concrete Curing Technology, Inc. "Instructions for Use of Pad".
"Electrical Floor Heating", portion of catalog from Heating Catalog, http://www.wattsradiant.com.
"The Future Looks Radiant", Full Line Radiant Catalong, http://www.wattsradiant.com 2007.
"Hotmesh", various pages from website, http://www.worldscientificdevelopment.com/hotmesh/motivation.html.
"Go Polymers" http://www.gopolymers.com/index.php?module-abs.
Julian Norley and Gary Chen "GrafTech High Performance, Lightweight Graphite Heat Sinks/Spreaders" IEEE 2002.
Grafoil Flexible Graphite "Typical Grafoil Sheet Properties".
"Springfield Wire Inc." http://www.springfield-wire.com/category.cfm?Category=21.
Office Action dated Jan. 25, 2006 cited in related Patent No. 7,230,213.
Office Action dated Aug. 28, 2006 cited in related Patent No. 7,230,213.
Notice of Allowance dated Feb. 7, 2007 cited in related Patent No. 7,230,213.
Office Action dated Jun. 22, 2006 cited in related Patent No. 7,183,524.
Notice of Allowance dated Nov. 29, 2006 cited in related Patent No. 7,183,524.
Office Action dated Mar. 15, 2007 cited in related U.S. Appl. No. 11/422,580.
Office Action dated Jul. 27, 2007 cited in related U.S. Appl. No. 11/422,580.
Office Action dated Dec. 10, 2008 cited in U.S. Appl. No. 11/422,580.
U.S. Appl. No. 11/422,580, filed Sep. 1, 2005, Naylor.
U.S. Appl. No. 11/744,163, filed May 3, 2007, Naylor.
U.S. Appl. No. 12/436,905, filed May 7, 2009, Caterina.
"Graftech" http://www.graftech.com.
International Search Report from PCT/US05/37414.
Written Opinion from PCT/US05/37414.
International Preliminary Report on Patentability from PCT/US05/37414.
International Search Report from PCT/US06/04437.
Written Opinion from PCT/US06/04437.
International Preliminary Report on Patentability from PCT/US06/04437.
International Search Report from PCT/US08/62481.
Written Opinion from PCT/US08/62481.
International Preliminary Report on Patentability from PCT/US08/62481.
International Search Report from PCT/US08/62479.
Written Opinion from PCT/US08/62479.
International Preliminary Report on Patentability from PCT/US08/62479.
International Search Report from PCT/US09/43443.
Notice of Allowance dated Nov. 16, 2009 cited in related U.S. Appl. No. 11/422,580.
U.S. Appl. No. 12/875,313, filed Sep. 3, Naylor.
U.S. Appl. No. 12/258,249, filed Mar. 7, 2012, Office Action.
U.S. Appl. No. 12/875,305, filed Mar. 8, 2012, Office Action.
U.S. Appl. No. 12/258,240, filed Mar. 14, 2012, Office Action.
U.S. Appl. No. 12/264,480, filed Mar. 14, 2012, Office Action.
U.S. Appl. No. 12/119,434, filed Jun. 14, 2011, Notice of Allowance.
U.S. Appl. No. 12/212,529, filed Sep. 23, 2011, Office Action.

(56) References Cited

OTHER PUBLICATIONS

U.S. Appl. No. 12/119,434, filed Oct. 26, 2011, Notice of Allowance.
U.S. Appl. No. 12/119,434, filed Mar. 14, 2012, Notice of Allowance.
GrafTech International "Dramatically Improve Your Radiant Floor Heating Performance" Copyright 2008 GrafTech International Holdings Inc. 1 page.
U.S. Appl. No. 11/422,580, filed Nov. 16, 2009, Notice of Allowance.
U.S. Appl. No. 11/422,580, filed Apr. 15, 2010, Notice of Allowance.
U.S. Appl. No. 11/422,580, filed Nov. 22, 2010, Notice of Allowance.
U.S. Appl. No. 11/835,641, filed Sep. 1, 2010, Office Action.
U.S. Appl. No. 12/119,434, filed Sep. 29, 2010, Office Action.
U.S. Appl. No. 12/119,434, filed Mar. 3, 2011, Notice of Allowance.
U.S. Appl. No. 11/422,580, filed Aug. 17, 2010, Notice of Allowance.
U.S. Appl. No. 12/875,313, filed Sep. 3, 2010, Naylor.
U.S. Appl. No. 13/607,531, filed Sep. 7, 2012, Naylor.
U.S. Appl. No. 12/119,434, filed May 29, 2012, Notice of Allowance.
U.S. Appl. No. 12/433,974, filed Sep. 17, 2012, Office Action.
U.S. Appl. No. 12/212,529, filed May 11, 2012, Final Office Action.
U.S. Appl. No. 12/843,523, filed Mar. 1, 2013, Office Action.
U.S. Appl. No. 12/843,523, filed Sep. 16, 2013, Notice of Allowance.
U.S. Appl. No. 13/607,531, filed Oct. 10, 2013, Office Action.
U.S. Appl. No. 14/107,697, filed Dec. 16, 2013, Notice of Allowance.
U.S. Appl. No. 14/107,697, filed Dec. 16, 2013, Naylor.
U.S. Appl. No. 12/212,529, filed Jun. 18, 2014, Office Action.
U.S. Appl. No. 12/433,974, filed Aug. 7, 2014, Office Action.

\* cited by examiner

MODULAR HEATED COVER

This application is a continuation of U.S. application Ser. No. 12/212,529 filed on Sep. 17, 2008 titled A GROUNDED MODULAR HEATED COVER, which is a continuation-in-part of U.S. application Ser. No. 11/835,641 filed on Aug. 8, 2007 now abandoned titled GROUNDED MODULAR HEATED COVER, which is a continuation in part of U.S. patent application Ser. No. 11/744,163 filed May 3, 2007 now abandoned. This application is also a continuation in part of U.S. application Ser. No. 11/422,580 filed on Jun. 6, 2006, now U.S. Pat. No. 7,880,121 titled "A RADIANT HEATING APPARATUS" which claims priority to U.S. Provisional Patent Application 60/688,146 filed Jun. 6, 2005, titled LAMINATE HEATING APPARATUS. U.S. application Ser. No. 11/422,580 filed on Jun. 6, 2006, titled "A RADIANT HEATING APPARATUS" is a Continuation in Part of U.S. patent application Ser. No. 11/218,156, filed Sep. 1, 2005, now U.S. Pat. No. 7,230,213 issued on Jun. 12, 2007, which claims priority to: U.S. Provisional Patent Application 60/654,702 filed on Feb. 17, 2005, titled A MODULAR ACTIVELY HEATED THERMAL COVER; U.S. Provisional Patent Application 60/656,060 filed Feb. 23, 2005 titled A MODULAR ACTIVELY HEATED THERMAL COVER; and U.S. Provisional Patent Application 60/688,146 filed Jun. 6, 2005, titled LAMINATE HEATING APPARATUS. U.S. application Ser. No. 11/422,580 filed on Jun. 6, 2006, titled "A RADIANT HEATING APPARATUS" is also a Continuation in Part of U.S. patent application Ser. No. 11/344,830, filed Feb. 1, 2006 now U.S. Pat. No. 7,183,524 issued on Feb. 27, 2007, which claims priority to: U.S. Provisional Patent Application 60/654,702 filed on Feb. 17, 2005, titled A MODULAR ACTIVELY HEATED THERMAL COVER; U.S. Provisional Patent Application 60/656,060 filed Feb. 23, 2005 titled A MODULAR ACTIVELY HEATED THERMAL COVER; and U.S. Provisional Patent Application 60/688,146 filed Jun. 6, 2005, titled LAMINATE HEATING APPARATUS.

BACKGROUND

Ice, snow and, frost create problems in many areas of construction. For example, when concrete is poured the ground must be thawed and free of snow and frost. In agriculture, planters often plant seeds, bulbs, and the like before the last freeze of the year. In such examples, it is necessary to keep the concrete, soil, and other surfaces free of ice, snow, and frost. In addition, curing concrete requires that the ground, ambient air, and newly poured concrete maintain a temperature between about 50 degrees and about 90 degrees. In industrial applications, outdoor pipes and conduits often require heating or insulation to avoid damage caused by freezing. In residential applications, it is beneficial to keep driveways and walkways clear of snow and ice.

Standard methods for removing and preventing ice, snow, and frost include blowing hot air or water on the surfaces to be thawed, running electric heat trace along surfaces, and/or laying tubing or hoses carrying heated glycol or other fluids along a surface. Unfortunately, such methods are often expensive, time consuming, inefficient, and otherwise problematic.

Ice buildup is particularly problematic in the construction industry. For example, ice and snow may limit the ability to pour concrete, lay roofing material, and the like. In these outdoor construction situations, time and money are frequently lost to delays caused by snow and ice. If delay is unacceptable, the cost to work around the situation may be unreasonable. For example, to pour concrete, the ground must be thawed to a reasonable depth to allow the concrete to adhere to the ground and cure properly. Typically, in order to pour concrete in freezing conditions, earth must be removed to a predetermined depth and replaced with gravel. This process is costly in material and labor.

In addition, it is important to properly cure the concrete for strength once it has been poured. Typically the concrete must cure for about seven days at a temperature within the range of 50 degrees Fahrenheit to 90 degrees Fahrenheit, with 70 degrees Fahrenheit as the optimum temperature. If concrete cures in temperatures below 50 degrees Fahrenheit, the strength and durability of the concrete is greatly reduced. In an outdoor environment where freezing temperatures exist or may exist, it is difficult to maintain adequate curing temperatures.

In roofing and other outdoor construction trades, it may be similarly important to keep work surfaces free of snow, ice, and frost. Additionally, it may be important to maintain specific temperatures for setting, curing, laying, and pouring various construction products including tile, masonry, or the like.

Although the need for a solution to these problems is particularly great in outdoor construction trades, a solution may be similarly beneficial in various residential, industrial, manufacturing, maintenance, and service fields. For example, a residence or place of business with an outdoor canopy, car port, or the like may require such a solution to keep the canopy free of snow and ice in order to prevent damage from the weight of accumulated precipitation or frost. Conventional solutions for keeping driveways, overhangs, and the like clear of snow typically require permanent fixtures that are both costly to install and operate, or small portable devices that do not cover sufficient surface area.

While some solutions are available for construction industries to thaw ground, keep ground thawed, and cure concrete, these solutions are large, expensive to operate and own, time consuming to setup and take down, and complicated. Conventional solutions employ heated air, oil, or fluid delivered to a thawing site by hosing. Typically, the hosing is then covered by a cover such as a tarp or enclosure. Laying and arranging the hosing and cover can be time consuming. Furthermore, heating and circulating the fluid requires significant energy in the form of heaters, pumps, and/or generators.

Currently, few conventional solutions use electricity to produce and conduct heat. Traditionally, this was due to limited circuit designs. Traditional solutions were unable to produce sufficient heat over a sufficient surface area to be practical. The traditional solutions that did exist required special electrical circuits with higher voltages and protected by higher-rated breakers. These special electrical circuits are often unavailable at a construction site. Thus, using standard circuits, conventional solutions are unable to produce sufficient heat over a sufficiently large surface area to be practical. Typically, 143 BTUs are required to melt a pound of ice. Conventional electrically powered solutions are incapable of providing 143 BTUs over a sufficiently large enough area for practical use in the construction industry. Consequently, the construction industry has turned to bulky, expensive, time consuming heated fluid solutions.

A further complication results from the relatively large current drawn through a modular heated cover, as described above. In order to use electricity to provide a solution, significant amounts of current are needed to provide the necessary heat. This high current may pose a safety risk to those working with or around the device. A broken electrical component which conducts electricity may pose a significant risk to a person who comes into contact with the broken component. A traditional solution to provide grounding would be to add a layer of conductive material to the cover and connect a grounding lead to the foil layer. However, adding another layer requires additional raw material and additional work in the manufacturing process, increasing the material costs and the cost of manufacturing the device. In addition, adding another layer increases the weight of the cover and may decrease its flexibility. Since the cover should ideally be mobile and flexible, adding a grounding layer lessens the effectiveness of the cover.

What is needed is a modular heated cover that operates using electricity from standard job site power supplies, is cost effective, portable, reusable, and modular to provide heated coverage for variable size surfaces efficiently and cost effectively. For example, the modular heated cover may comprise a pliable material that can be rolled or folded and transported easily. Furthermore, the modular heated cover would be configured such that two or more modular heated covers can easily be joined to accommodate various surface sizes. Beneficially, such a device would provide directed radiant heat, modularity, weather isolation, temperature insulation, and solar heat absorption. The modular heated cover would maintain a suitable temperature for exposed concrete to cure properly and quickly and efficiently remove ice, snow, and frost from surfaces, as well as penetrate soil and other material to thaw the material to a suitable depth for concrete pours and other construction projects. In addition, the modular heated covers should be configured such that they are less likely to result in harm to an individual working with the covers in the event of an electrical failure in one or more covers. Ideally, the modular heated covers should be grounded in a manner that does not decrease flexibility, increase weight, or require the addition of new layers to the cover.

SUMMARY

The present invention has been developed in response to the present state of the art, and in particular, in response to the problems and needs in the art that have not yet been fully solved by currently available ground covers. Accordingly, the present invention has been developed to provide a grounded modular heated cover and associated system that overcome many or all of the above-discussed shortcomings in the art.

A grounded modular heated cover is presented which comprises a pliable electrical heating element configured to convert electrical energy to heat energy. The pliable electrical heating element comprises a resistive element for converting electrical current to heat energy. The pliable electrical heating element further comprises a substantially planar heat-spreading element comprising an electrically-conductive material comprising carbon. The heat-spreading element is situated proximate to the resistive element, and an electrically insulating element separates the resistive element from the heat-spreading element such that the resistive element is not in electric communication with the heat-spreading element.

The grounded modular heated cover further comprises a pliable outer layer configured to circumscribe the pliable electrical heating element and provide durable protection in an outdoor environment and a receiving power coupling configured to couple to a power source, the receiving power coupling further comprising a hot prong and a neutral prong, the hot prong and neutral prong electrically connected to the resistive element, and a grounding prong, the grounding prong electrically connected to the heat-spreading element.

In certain embodiments, the grounded modular heated cover further comprises a female electric power coupling configured to optionally couple a first grounded modular heated cover to a second grounded modular heated cover by receiving the receiving power coupling of the second grounded modular heated cover, the female electric power coupling comprising a hot prong coupler and a neutral prong coupler connected to the pliable electrical heating element of the first grounded modular heated cover and a grounding prong coupler electrically connected to the heat-spreading element of the first grounded modular heated cover.

The grounded modular heated cover may also have the receiving power coupling configured to be connected to a 120 Volt power source, and a second receiving power coupling configured to be connected to a 240 Volt power source, the second receiving power coupling further comprising a hot prong and a neutral prong electrically connected to the resistive element and a grounding prong electrically connected to the heat-spreading element.

In certain embodiments the grounded modular heated cover further comprises a grounding layer, which grounding layer is electrically insulated from the resistive element and situated such that the resistive element is situated between the grounding layer and the heat-spreading element, the grounding layer proximate to the resistive element and electrically connected to the grounding prong of the receiving power coupling.

The grounded modular heated cover may also comprise a grounding sheath, the grounding sheath encompassing the resistive element and further configured to be electrically connected to the grounding prong of the receiving power coupling.

The grounding prong may further comprise a connection blade, and the connection blade may be electrically connected to the heat-spreading element such that an electric connection is made along the plane of the heat-spreading element. In certain embodiments, the heat spreading element is approximately three feet wide and twenty-three feet long and between approximately 1 thousandths of an inch thick and about 40 thousandths of an inch thick.

Also disclosed is a system for heating a surface, which system comprises a power source configured to supply an electrical current on a 120 volt electric circuit having a breaker rated up to about 20 Amps, the power source further comprising a ground connection. The system also comprises one or more grounded modular heated covers which comprise an outer layer providing durable protection for inner layers which comprise an electrical heating element configured to convert electrical energy to heat energy.

The inner layers further comprise a planar heat spreading element comprising an electrically-conductive carbon allotrope in electrically-insulated contact with the electrical heating element. The heat-spreading element is configured to distribute the heat energy generated by the electrical heating element.

The surface area of the modular heated cover is between approximately ten square feet and approximately 253 square feet. The modular heated cover also comprises a receiving electrical power plug comprising a hot prong and a neutral prong electrically connected to the electrical heating element such that electrical energy is obtained from the power source. The receiving electrical power plug further comprises a grounding prong electrically connected to the heat-spreading element. In addition, the modular heated cover comprises a connecting electrical power plug for conveying electrical energy from a first modular heated cover to a second modular heated cover, the connecting electric power plug comprising a hot prong and a neutral prong connected to the pliable electrical heating element and a grounding prong electrically connected to the heat-spreading element.

The system may further comprise a plurality of connecting electric power plugs and receiving electric power plugs disposed about the perimeter of the thermal cover for coupling multiple modular thermal covers. Further, a plurality of grounded modular heated covers may be electrically connected with the receiving electrical power plug of a second grounded modular heated cover coupled to the connecting electrical power plug of the first grounded modular heated cover, the electrical connection such that an electrical ground connection is established from each of the plurality of grounded modular heat covers to the ground connection of the power source.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of materials, layers, connectors, conductors, insulators, and the like, to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
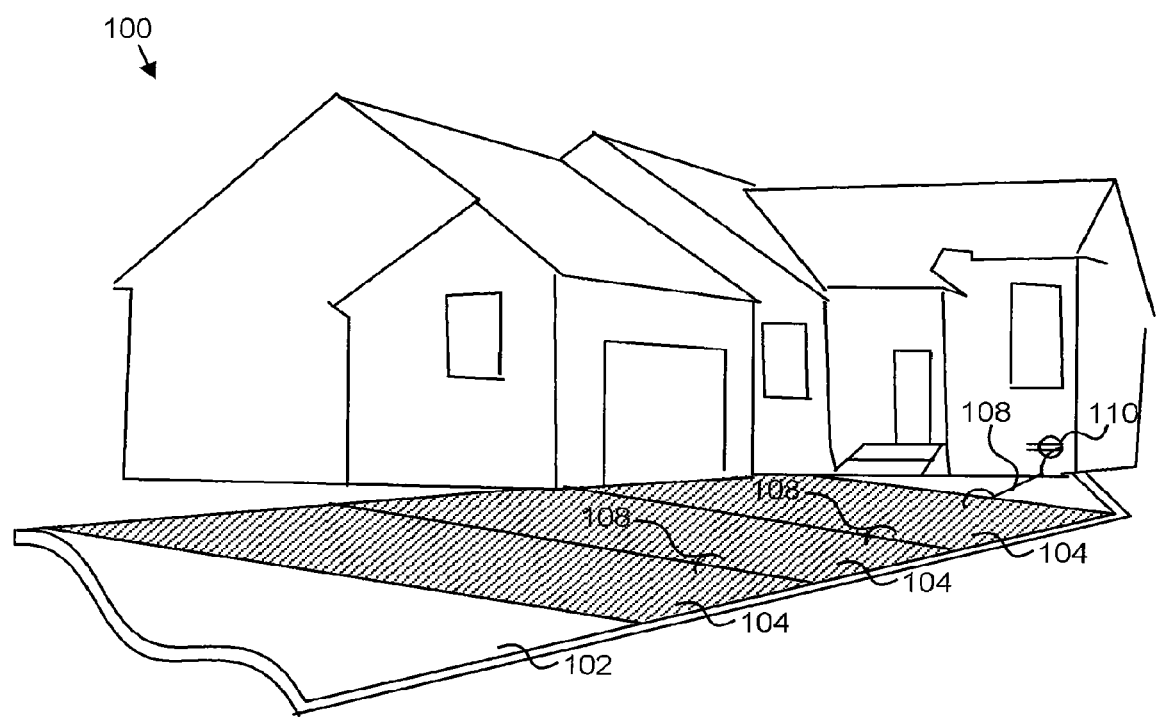
FIG. 1 is a schematic diagram illustrating one embodiment of a system for implementing a modular heated cover.

FIG. 1 illustrates one embodiment of a system 100 for implementing a grounded modular heated cover. In one embodiment, the system 100 includes a surface 102 to be heated, one or more modular heated covers 104, one or more electrical coupling connections 106, a power extension cord 108, and an electrical power source 110.

In various embodiments, the surface to be heated 102 may be planer, curved, or of various other geometric forms. Additionally, the surface to be heated 102 may be vertically oriented, horizontally oriented, or oriented at an angle. In one embodiment, the surface to be heated 102 is concrete. For example, the surface 102 may include a planar concrete pad. Alternatively, the surface may be a cylindrical concrete pillar poured in a vertically oriented cylindrical concrete form. In such embodiments, the thermal cover 104 may melt frost, ice and snow on the concrete and prevent formation of ice, frost and snow on the surface of the concrete and thermal cover 104.

In another alternative embodiment, the surface 102 may be ground soil of various compositions. In certain circumstances, it may be necessary to heat a ground surface 102 to thaw frozen soil and melt frost and snow, or prevent freezing of soil and formation of frost and snow on the surface of the soil and thermal cover 104. It may be necessary to thaw frozen soil to prepare for pouring new concrete. One of ordinary skill in the art of concrete will recognize the depth of thaw required for pouring concrete and the temperatures required for curing concrete. Alternatively, the surface 102 may comprise poured concrete that has been finished and is beginning the curing process.

In one embodiment, one or more modular heated covers 104 are placed on the surface 102 to thaw or prevent freezing of the surface 102. A plurality of thermal covers 104 may be connected by electrical coupling connections 106 to provide heat to a larger area of the surface 102. In one embodiment, the modular heated covers 104 may include a physical connecting means, an electrical connector, one or more insulation layers, and an active electrical heating element. The electrical heating elements of the thermal covers 104 may be connected in a series configuration. Alternatively, the electrical heating elements of the thermal covers 104 may be connected in a parallel configuration. Detailed embodiments of modular heated covers 104 are discussed further with relation to FIG. 2 through FIG. 4.

In certain embodiments, the electrical power source 110 may be a power outlet connected to a 120V or 240 V AC power line. Alternatively, the power source 110 may be an electricity generator. In certain embodiments, the 120V power line may supply a range of current between about 15 A and about 50 A of electrical current to the thermal cover 104. Alternative embodiments of the power source 110 may include a 240V AC power line. The 240V power line may supply a range of current between about 30 A and about 70 A of current to the thermal cover 104. Various other embodiments may include supply of three phase power, Direct Current (DC) power, 110V or 220V power, or other power supply configurations based on available power, geographic location, and the like. Ideally, the power source 110 comprises a standard three-prong connection and provides an electrical ground for devices coupled to the power source 110.

In one embodiment, a power extension cord 108 may be used to create an electrical connection between a modular heated cover 104, and an electrical power source 110. In one embodiment, the extended electrical coupler 108 is a standard extension cord. Alternatively, the extended electrical coupler 108 may include a heavy duty conductor such as 4 gauge copper and the required electrical connector configuration to connect to high power outlets. Power extension cords 108 may be used to connect the power source 110 to the thermal covers 104, or to connect one thermal cover 104 to another thermal cover 104. In such embodiments, the power extension cords 108 are configured to conduct sufficient electrical current to power the electrical heating element of the modular heated covers 104. One of ordinary skill in the art of power engineering will understand the conductor gauge requirements based on the electric current required to power the thermal cover 104.

Figure 2:
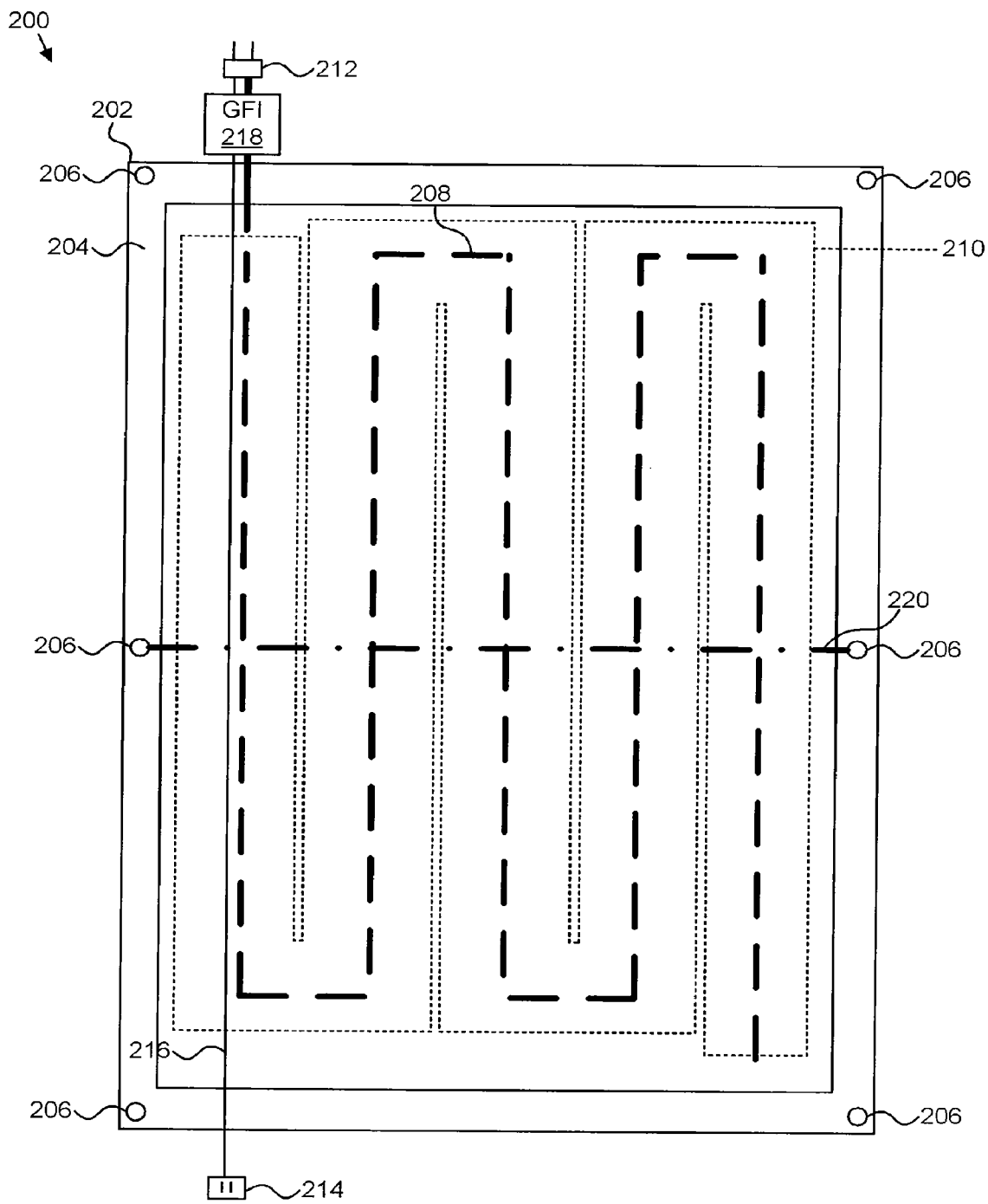
FIG. 2 is a schematic diagram illustrating one embodiment of a modular heated cover.

FIG. 2 illustrates one embodiment of a modular heated cover 200. In one embodiment, the cover 200 includes a multilayered cover 202. The multilayered cover 202 may include a flap 204. Additionally, the cover 200 may be coupled to an electrical heating element. In one embodiment, the electrical heating element comprises a resistive element 208 and a heat spreading element 210. The electrical heating element may further comprise an electrical insulating element described in greater detail below. The cover 200 may additionally include one or more fasteners 206, one or more electric power connections 212, one or more electric power couplings 214, and an electrical connection 216 between the connections 212 and the couplings 214. In certain embodiments the thermal cover 200 may additionally include a GFI device 218 and one or more creases 220.

The multilayered cover 202 may comprise a textile fabric. The textile fabric may include natural or synthetic products. For example, the multilayered cover 202 may comprise burlap, canvas, or cotton. In another example, the multilayered cover 202 may comprise nylon, vinyl, or other synthetic textile material. For example, the multilayered cover 202 may comprise a thin sheet of plastic, metal foil, polystyrene, or the like. Further embodiments of the multilayered cover 202 are discussed below with regard to FIG. 3.

In one embodiment, the flap 204 may overlap another thermal cover 200. The flap 204 may provide isolation of air trapped beneath the thermal cover 200. Isolation of the air trapped beneath the thermal cover 200 prevents heat loss due to air circulation. Additionally, the flap 204 may include one or more fasteners 206 for hanging, securing, or connecting the thermal cover 200. In one embodiment, fasteners 206 may be attached to the corners of the cover 200. Additionally, fasteners 206 may be distributed about the perimeter of the cover 200. In one embodiment, the fastener 206 is Velcro™. For example, the flap may include a hook fabric on one side and a loop fabric on the other side. In another alternative embodiment, the fastener 206 may include snaps, zippers, adhesives, and the like.

In another embodiment, the flap 204 may be weighted to hold the flap 204 into position to retain air. For example, the flap 204 may comprise a pocket that may be filled with a weight material, such as sand, snow, soil, water, or gravel. In certain embodiments, the pocket may be filled by a user when the modular heated cover 200 is in use, and emptied for storage and transport.

In one embodiment, the electrical heating element comprises an electro-thermal coupling material or resistive element 208. For example, the resistive element 208 may be a copper conductor. The copper conductor may convert electrical energy to heat energy, and transfer the heat energy to the surrounding environment. Alternatively, the resistive element 208 may comprise another conductor capable of converting electrical energy to heat energy. One skilled in the art of electro-thermal energy conversion will recognize additional material suitable for forming the resistive element 208. Additionally, the resistive element 208 may include one or more layers for electrical insulation, temperature regulation, and ruggedization. In one embodiment, the resistive element 208 may include two conductors connected at one end to create a closed circuit that can be connected to a power source comprising a hot and a neutral connection.

Additionally, the electrical heating element may comprise a heat spreading element 210. In general terms, the heat spreading element 210 is a layer or material capable of drawing heat from the resistive element 208 and distributing the heat energy away from the resistive element 208. Specifically, the heat spreading element 210 may comprise a metallic foil, graphite, carbon composites, a composite material, or other substantially planar material. Preferably, the heat spreading element 210 comprises a material that is thermally anisotropic such that heat is more efficiently transferred in one plane. The thermally anisotropic material may distribute the heat energy more evenly and more efficiently. The heat spreading element 210, in one embodiment, conducts, transfers, and evenly distributes heat energy from the resistive element 208 to a large surface area.

The heat-spreading element 220 in one embodiment is an electrically-conductive material comprising carbon. Graphite is one example of an electrically-conductive material comprising carbon. However, other suitable materials may include carbon-based powders, carbon fiber structures, or carbon composites. Those of skill in the art will recognize that material comprising carbon may further comprise other elements, whether they represent impurities or additives to provide the material with particular additional features. Materials comprising carbon may be suitable so long as they have sufficient thermal conductivity to act as a heat-spreading element 210. In one embodiment, the material comprising carbon comprises sufficient electrical conductivity to act as a ground connection. The heat-spreading element 220 may further comprise a carbon derivative, or a carbon allotrope.

One example of a material suitable for a heat spreading layer 210 is a graphite-epoxy composite. The in-plane thermal conductivity of a graphite-epoxy composite material is approximately 370 watts per meter per Kelvin, while the out of plane thermal conductivity of the same material is 6.5 watts per meter per Kelvin. The thermal anisotropy of the graphite/epoxy composite material is then 57, meaning that heat is conducted 57 times more readily in the plane of the material than through the thickness of the material. This thermal anisotropy allows the heat to be readily spread out from the surface which in turn allows for more heat to be drawn out of the resistive elements 208.

Another such material suitable for forming the heat spreading layer 210 is GRAFOIL® available from Graftech Inc. located in Lakewood, Ohio. GRAFOIL® is a graphite sheet product made by taking particulate graphite flake and processing it through an intercalculation process using mineral acids. The flake is heated to volatilize the acids and expand the flake to many times its original size. The result is a sheet material that typically exceeds 98% carbon by weight. The sheets are flexible, lightweight, compressible resilient, chemically inert, fire safe, and stable under load and temperature. The sheet material typically includes one or more laminate sheets that provide structural integrity for the graphite sheet.

Due to its crystalline structure, GRAFOIL® is significantly more thermally conductive in the plane of the sheet than through the plane of the sheet. This superior thermal conductivity in the plane of the sheet allows temperatures to quickly reach equilibrium across the breadth of the sheet.

Typically, the GRAFOIL® will have no binder, resulting in a very low density, making the heated cover relatively light while maintaining the desired thermal conductivity properties. For example, the standard density of GRAFOIL® is about 1.12 g/ml. It has been shown that three stacked sheets of 0.030" thick GRAFOIL® C have similar thermal coupling performance to a 0.035" sheet of cold rolled steel, while weighing about 60% less than the cold rolled steel sheet.

Another product produced by GrafTech Inc. that is suitable for use as a heat spreading element 210 is eGraf® SpreaderShield™. The thermal conductivity of the SpreaderShield™ products ranges from 260 to 500 watts per meter per Kelvin within the plane of the material, and that the out of plane (through thickness) thermal conductivity ranges from 6.2 down to 2.7 watts per meter per Kelvin. The thermal anisotropy of the material ranges from 42 to 163. Consequently, a thermally anisotropic planar heat spreading element 210 serves as a conduit for the heat within the plane of the heat spreading element 210, and quickly distributes the heat more evenly over a greater surface area than a foil. The efficient planar heat spreading ability of the planar heat spreading element 210 also provides for a higher electrical efficiency, which facilitates the use of conventional power supply voltages such as 120 volts on circuits protected by 20 Amp breakers, instead of less accessible higher voltage power supplies.

Preferably, the heat spreading element 210 is a planar thermal conductor. In certain embodiments, the heat spreading layer 210 is formed in strips along the length of the resistive element 208. In alternative embodiments, the heat spreading element 210 may comprise a contiguous layer. In certain embodiments, the heat spreading layer 210 may cover substantially the full surface area covered by the thermal cover 200 for even heat distribution across the full area of the thermal cover 200.

In certain embodiments, the resistive element 208 is in direct contact with the heat spreading element 210 to ensure efficient thermo-coupling. Alternatively, the heat spreading element 210 and the resistive element 208 are integrally formed. For example, the heat spreading element 210 may be formed or molded around the resistive element 208. Alternatively, the resistive element 208 and the heat spreading element 210 may be adhesively coupled.

In one embodiment, the thermal cover 200 includes means, such as electrical coupling connections 106, for electric power transfer from one thermal cover 200 to another in a modular chain. For example, the thermal cover 200 may include an electric connection 212 and an electric coupling 214. In one embodiment, the electric connection 212 and the electric coupling 214 may include an electric plug 212 and an electric socket 214, and are configured according to standard requirements according to the power level to be transferred. For example, the electric plug 212 and the electric socket 214 may be standard two prong connectors for low power applications. Alternatively, the plug 212 and socket 214 may be a three prong grounded configuration, or a specialized prong configuration for higher power transfer.

In one embodiment, the electrical connection 216 is an insulated wire conductor for transferring power to the next thermal cover 200 in a modular chain. The electrical connection 216 may be connected to the electric plug 212 and the electric socket 214 for a power transfer interface. In one embodiment, the electrical connection 216 is configured to create a parallel chain of active electrical heating elements 210. Alternatively, the electrical connection 216 is configured to create a series configuration of active electrical heating elements 210. In an alternative embodiment, the resistive element 212 may additionally provide the electrical connection 216 without requiring a separate conductor. In certain embodiments, the electrical connection 216 may be configured to provide electrical power to a plurality of electrical power couplings 214 positioned at distributed points on the thermal cover 200 for convenience in coupling multiple modular thermal covers 200. For example, a second thermal cover 200 may be connected to a first thermal cover 200 by corresponding power couplings 214 to facilitate positioning of the thermal covers end to end, side by side, in a staggered configuration, or the like.

Additionally, the thermal cover 200 may include a Ground Fault Interrupter (GFI) or Ground Fault Circuit Interrupter (GFCI) safety device 218. The GFI device 218 may be coupled to the power connection 212. In certain embodiments, the GFI device 218 may be connected to the resistive element 208 and interrupt the circuit created by the resistive element 208. The GFI device 218 may be provided to protect the thermal cover 200 from damage from spikes in electric current delivered by the power source 110.

In certain additional embodiments, the thermal cover 200 may include one or more creases 220 to facilitate folding the thermal cover 200. The creases 220 may be oriented across the width or length of the thermal cover 200. In one embodiment, the crease 220 is formed by heat welding a first outer layer to a second outer layer. Preferably, the thermal cover 200 comprises pliable material, however the creases 220 may facilitate folding a plurality of layers of the thermal cover 200.

In one embodiment, the thermal cover 200 may be twelve feet by twenty-five feet in dimension. In another embodiment, the thermal cover 200 may be six feet by twenty-five feet. In a more preferred embodiment, the thermal cover 200 is eleven feet by twenty three feet. Alternatively, the thermal cover 200 may be two to four feet by fifty feet to provide thermal protection to the top of concrete forms. Additional alternative dimensional embodiments may exist. Consequently, the thermal cover 200 in different size configurations covers between about one square foot up to about two-hundred and fifty-three square feet. Preferred embodiments may include sizes for the thermal cover 200 of between ten square feet and two hundred and fifty-three square feet.

Beneficially, a two-hundred and fifty-three square foot area is covered and kept at optimal concrete curing temperatures or at optimal heating temperatures for thawing froze or cold soil. Advantageously, the high square footage can be heated using a single thermal cover 200 connected to a single 120 volt circuit. Preferably, the 120 volt circuit is protected by up to about a 20 Amp breaker. In addition, with the first thermal cover 200 connected to the power source 110 a second thermal cover 200 can be safely connected to the first thermal cover 200 without tripping the breaker.

Consequently, the present invention allows up to two or more thermal covers 200 to be modularly connected such that about five hundred and six square feet are covered and heated using the present invention. Advantageously, the five hundred and six square feet are heated using a single 120 Volt circuit protected by up to a 20 Amp breaker. Tests of certain embodiments of the present invention have been conducted in which two thermal covers 200 were modularly connected to cover about five hundred and six square feet. Those of skill in the art will recognize that more than two thermal covers may be connected on a single 120 Volt circuit with up to a 20 Amp breaker if the watts used per foot is lowered.

Figure 3:
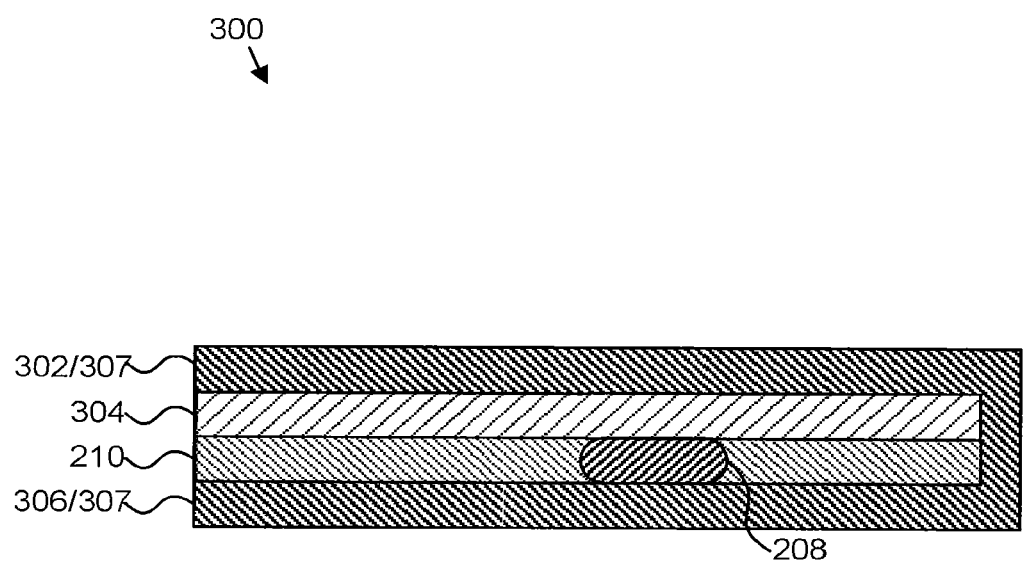
FIG. 3 is a schematic cross-sectional diagram illustrating one embodiment of a modular heated cover.

FIG. 3 illustrates one embodiment of a multilayer modular heated cover 300. In one embodiment, the thermal cover 300 includes a first outer layer 302, a thermal insulation layer 304, a resistive element 208, a heat spreading element 210, and a second outer layer 306. In one embodiment, the layers of the thermal cover 300 comprise fire retardant material. In one embodiment, the materials used in the various layers of the thermal cover 300 are selected for high durability in an outdoor environment, light weight, fire retardant, sun and water rot resistant characteristics, water resistant characteristics, pliability, and the like. For example, the thermal cover 300 may comprise material suitable for one man to fold, carry, and spread the thermal cover 300 in a wet, rugged, and cold environment. Therefore, the material is preferably lightweight, durable, water resistant, fire retardant, and the like. Additionally, the material may be selected based on cost effectiveness.

In one embodiment, the first outer layer 302 may be positioned on the top of the thermal cover 300 and the second outer layer 306 may be positioned on the bottom of the thermal cover 300. In certain embodiments, the first outer layer 302 and the second outer layer 306 may comprise the same or similar material. Alternatively, the first outer layer 302 and the second outer layer 306 may comprise different materials, each material possessing properties beneficial to the specified surface environment.

For example, the first outer layer 302 may comprise a material that is resistant to sun rot such as such as polyester, plastic, and the like. The bottom layer 306 may comprise material that is resistant to mildew, mold, and water rot such as nylon. The outer layers 302, 306 may comprise a highly durable material. The material may be textile or sheet, and natural or synthetic. For example, the outer layers 302, 306 may comprise a nylon textile. Additionally, the outer layers 302, 306 may be coated with a water resistant or waterproofing coating. For example, a polyurethane coating may be applied to the outer surfaces of the outer layers 302, 310. Additionally, the top and bottom outer layers 302, 306 may be colored, or coated with a colored coating such as paint. In one embodiment, the color may be selected based on heat reflective or heat absorptive properties. For example, the top layer 302 may be colored black for maximum solar heat absorption. The bottom layer 302 may be colored grey for a high heat transfer rate or to maximize heat retention beneath the cover.

In another embodiment, the modular heated cover 300 may include a single outer layer 306. The single outer layer 306 may be disposed on the bottom of the modular heated cover 300 and provide durable protection in an outdoor environment to other components of the modular heated cover 300. In certain embodiments, the modular heated cover 300 may include a single outer layer 307 (comprised of both 302 and 306) configured to wrap around the components of the modular heated cover 300. The single outer layer 307 may form a water tight envelope to protect the modular heated cover 300.

In one embodiment, the thermal insulation layer 304 provides thermal insulation to retain heat generated by the resistive element 208 beneath the thermal cover 300. In one embodiment, the thermal insulation layer 304 is a sheet of polystyrene. Alternatively, the insulation layer may include cotton batting, Gore-Tex®, fiberglass, or other insulation material. In certain embodiments, the thermal insulation layer 304 may allow a portion of the heat generated by the resistive element 208 to escape the top of the thermal cover 300 to prevent ice and snow accumulation on top of the thermal cover 300. For example, the thermal insulation layer 304 may include a plurality of vents to transfer heat to the top layer 302. In certain embodiments, the thermal insulation layer 304 may be integrated with either the first outer layer 302 or the second outer layer 306. For example, the first outer layer 302 may comprise an insulation fill or batting positioned between two films of nylon.

In certain embodiments, the modular heated cover 300 may be constructed with no thermal insulation layer 304 or with a minimal or nominal thermal insulation layer 304. In these embodiments, the modular heated cover 300 may be used alone, or in conjunction with a separate insulation layer. In embodiments without thermal insulation layers 304, the modular heated cover 300 may have reduced weight and bulk, and separate insulation may be added to the top of the modular heated cover 300 to match the needs of the surrounding environment. Examples of separate insulation layers include blankets made from cotton batting, fiberglass, straw, conventional passive concrete curing blankets, or the like.

In one embodiment, the heat spreading element 210 is placed in direct contact with the resistive element 208. The heat spreading element 210 may conduct heat away from the resistive element 208 and spread the heat for a more even distribution of heat. The heat spreading element 210 may comprise any heat conductive material. For example, the heat spreading element 210 may comprise metal foil, wire mesh, and the like. In one embodiment, the resistive element 208 may be wrapped in metal foil. The resistive element 208 may be made from metal such as copper or other heat conductive material such as graphite. Alternatively, the conductive layer may comprise a heat conducting liquid such as water, oil, grease or the like.

Alternatively, the heat spreading element 210 is placed proximate to the resistive element 208 such that the two are not in electrical contact, but sufficiently close to allow for efficient thermal transfer. In certain embodiments, this entails the resistive element 208 being within ¼ inch of the heat spreading element 210 or closer.

Figure 4:
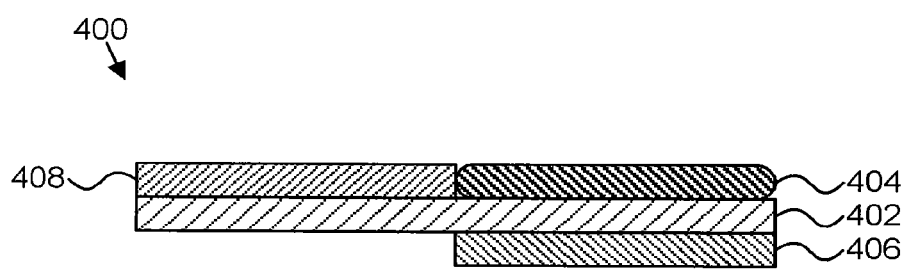
FIG. 4 is a schematic cross-sectional diagram illustrating one embodiment of an air isolation flap.

FIG. 4 illustrates a cross-sectional diagram of one embodiment of an air isolation flap 400. In one embodiment, the air isolation flap 400 includes a portion of a covering sheet 402, a weight 404, a bottom connecting means 406, and a top connecting means 408. In one embodiment, the air isolation flap 400 may extend six inches from the edges of the thermal covering 300. In one embodiment, the air isolation flap 400 may additionally include heavy duty riveted, or tubular edges (not shown) for durability and added air isolation. The covering sheet 402 may comprise a joined portion of the first outer cover 302 and second outer cover 306 that extends around the perimeter of the cover 200 and does not include any intervening layers such as heat spreading layer 210 or thermal insulation layer 304.

In one embodiment, the weight 404 is lead, sand, or other weighted material integrated into the air isolation flap 400. Alternatively, the weight may be rock, dirt, or other heavy material placed on the air isolation flap 400 by a user of the thermal cover 200.

In one embodiment, the bottom connecting means 406 and the top connecting means 408 may substantially provide air and water isolation. In one embodiment, the top and bottom connecting means 408, 406 may include weather stripping, adhesive fabric, Velcro, or the like.

Figure 5:
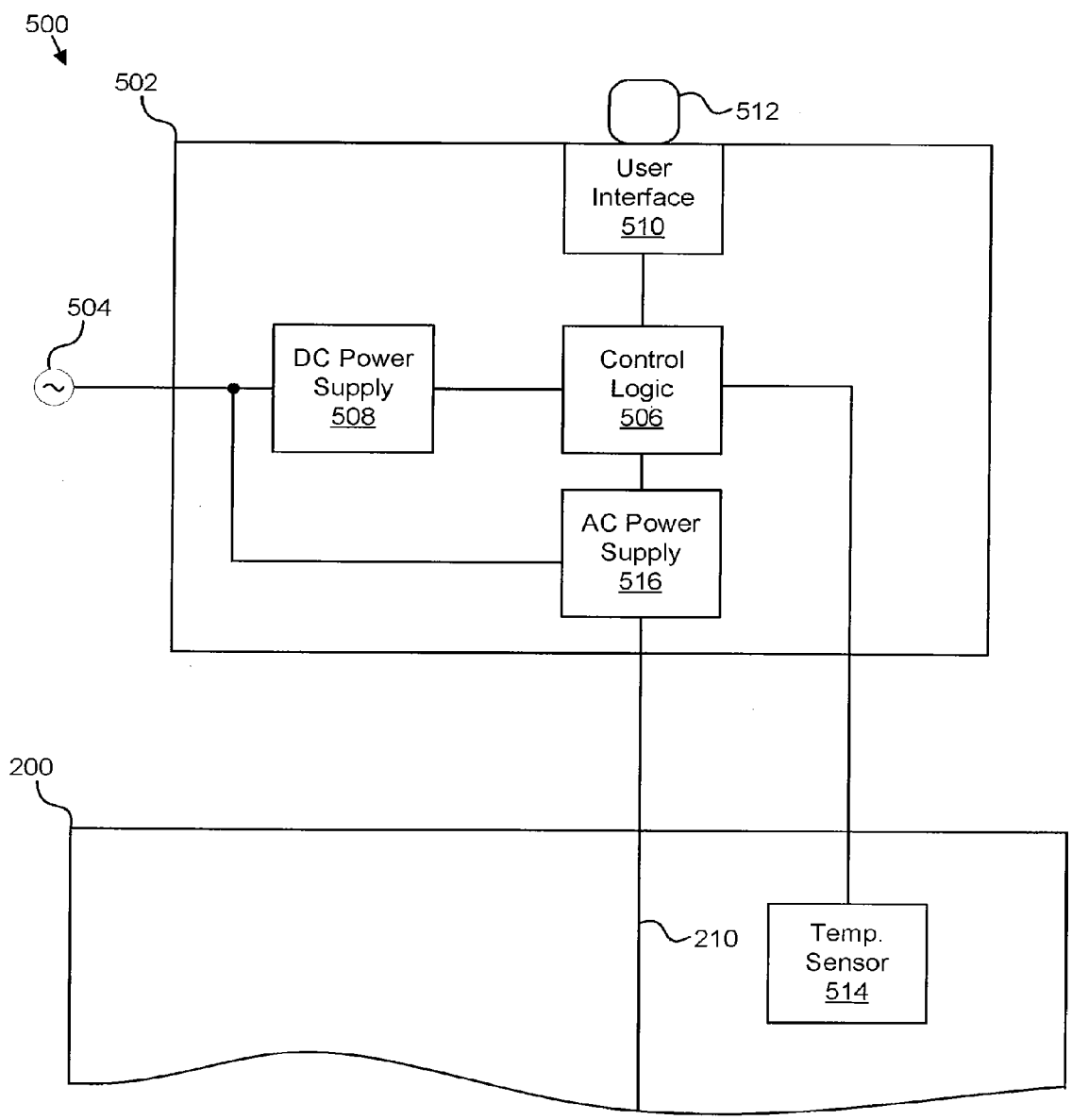
FIG. 5 is a schematic block diagram illustrating one embodiment of a temperature control module.

FIG. 5 illustrates one embodiment of a modular temperature control unit 500. In one embodiment, the temperature control unit may include a housing 502, control logic 506, a DC power supply 508 connected to an AC power source 504, an AC power supply for the thermal cover 200, a user interface 510 with an adjustable user control 512, and a temperature sensor 514.

In one embodiment, the control logic 506 may include a network of amplifiers, transistors, resistors, capacitors, inductors, or the like configured to automatically adjust the power output of the AC power supply 516, thereby controlling the heat energy output of the resistive element 208. In another embodiment, the control logic 206 may include an integrated circuit (IC) chip package specifically for feedback control of temperature. In various embodiments, the control logic 506 may require a 3V-25V DC power supply 508 for operation of the control logic components.

In one embodiment, the user interface 510 comprises an adjustable potentiometer. Additionally, the user interface 510 may comprise an adjustable user control 512 to allow a user to manually adjust the desired power output. In certain embodiments, the user control may include a dial or knob. Additionally, the user control 512 may be labeled to provide the user with power level or temperature level information.

In one embodiment, the temperature sensor 514 is integrated in the thermal cover 200 to provide variable feedback signals determined by the temperature of the thermal cover 200. For example, in one embodiment, the control logic 506 may include calibration logic to calibrate the signal level from the temperature sensor 514 with a usable feedback voltage.

Figure 6:
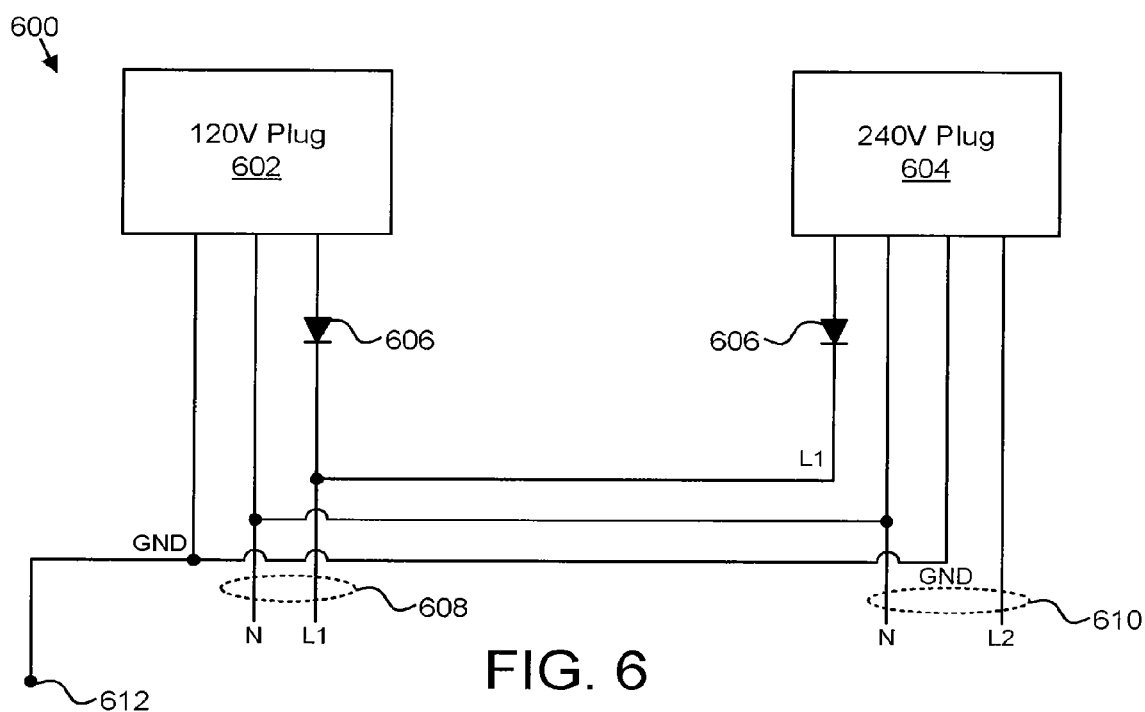
FIG. 6 is a schematic block diagram illustrating one embodiment of an apparatus for providing versatile power connectivity and thermal output.

FIG. 6 illustrates one embodiment of an apparatus 600 for providing versatile power connectivity and thermal output. In one embodiment, the apparatus 600 includes a first electrical plug 602 configured for 120V power, a second electrical plug 604 configured for 240V power, a directional power diode 606, a first active electrical heating element 608, and a second active electrical heating element 610.

In one embodiment, the first electrical heating element 608 is powered when the 120V plug 602 is connected, but the second electrical heating element 610 is isolated by the directional power diode 606. In an additional embodiment, the first electrical heating element 608, and the second electrical heating element 610 are powered simultaneously. In this embodiment, the first electrical heating element 608 and the second electrical heating element 610 are coupled by the directional power diode 606.

In one embodiment, the directional power diode 606 is specified to operate at 240V and up to 70 A. The directional power diode 606 allows electric current to flow from the 240V line to the first electrical heating element 608, but stops electric current flow in the reverse direction. In another embodiment, the directional power diode 606 may be replaced by a power transistor configured to switch on when current flows from the 240V line and switch off when current flows from the 120V line.

In one embodiment, the safety ground lines from the 120V connector 602 and the 240V connector 604 are connected to thermal cover 200 at connection point 612. In one embodiment, the safety ground 612 is connected to the heat spreading element 210. Alternatively, the safety ground 612 is connected to the outer layers 302, 310. In another alternative embodiment, the safety ground 612 may be connected to each layer of the thermal cover 200.

Beneficially, the apparatus 600 provides high versatility for power connections, provides variable heat intensity levels, and the like. For example, the first active electrical heating element 608 and the second active electrical heating element 610 may be configured within the thermal cover 200 at a spacing of four inches. In one embodiment, the first active electrical heating element 608 and the second active electrical heating element 610 connect to a hot and a neutral power line.

The electrical heating elements may be positioned within the thermal cover 200 in a serpentine configuration, an interlocking finger configuration, a coil configuration, or the like. When the 120V plug 602 is connected, only the first active electrical heating element 608 is powered. When the 240V plug 604 is connected, both the first active electrical heating element 608 and the second active electrical heating element 610 are powered. Therefore, the resulting effective spacing of the electrical heating elements is only four inches.

The powered lines of both the 120V plug 602 and the 240V plug 604 may be connected to a directional power diode to isolate the power provided from the other plug. Alternatively, a power transistor, mechanical switch, or the like may be used in the place of the directional power diode to provide power isolation to the plugs. In another embodiment, the both the 120V plug 602, and the 240V plug 604 may include waterproof caps (not shown). In one embodiment, the caps (not shown) may include a power terminating device for safety.

Figure 7:
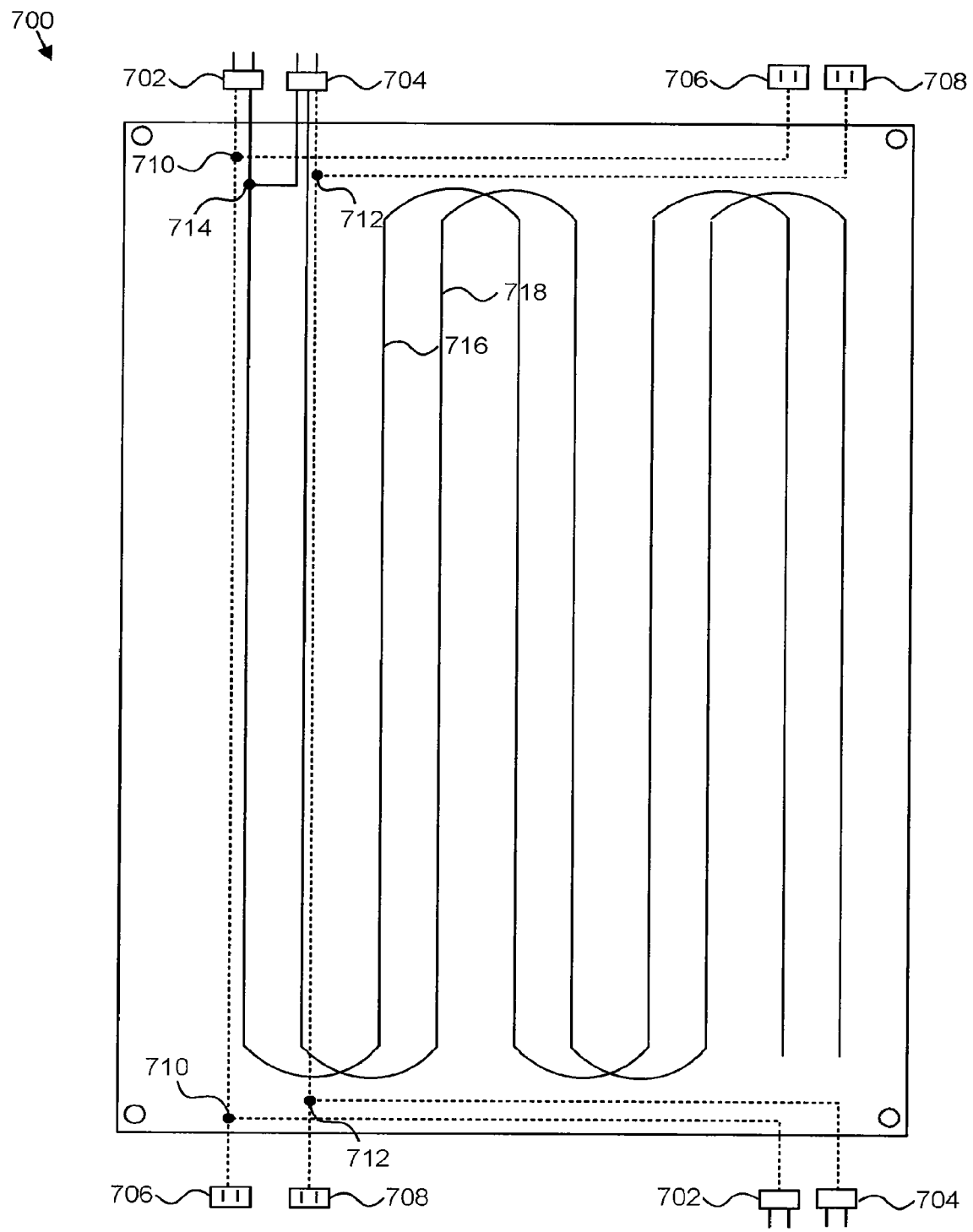
FIG. 7 is a schematic block diagram illustrating one embodiment of a modular heated cover.

FIG. 7 illustrates one embodiment of a modular heated cover 700. In one embodiment, the thermal cover 700 includes one or more 120V plug connectors 702, one or more 240V plug connectors 704, one or more 120V receptacle connectors 706, and one or more 240V receptacle connectors 708. Additionally, the thermal cover 700 may include one or more power bus connections 710 for a 120V power connection, and one or more power bus connections 712 for a 240V power connection.

In one embodiment, the thermal cover 700 may additionally include a power connection 714 between the 120V power line, and one 120V phase of the 240V power line. In certain embodiments, the connection 714 provides power to a first active electrical heating element 716 when the 240V power connector 704 is plugged in. In one embodiment, the 240V power connector 704 may additionally provide power to a second active electrical heating element 718. The 120V power connector 702 may provide power to the first active electrical heating element 716, but not the second active electrical heating element 718. For example, if the 120V power connector 702 is connected to a power source, only the first active electrical heating element 716 is powered. However, if the 240V power connector 704 is connected to a power source, both the first active electrical heating element 716, and the second active electrical heating element 718 are powered. In this example, the first active electrical heating element 716 is powered by the 240V connector through the power connection 714.

Figure 8:
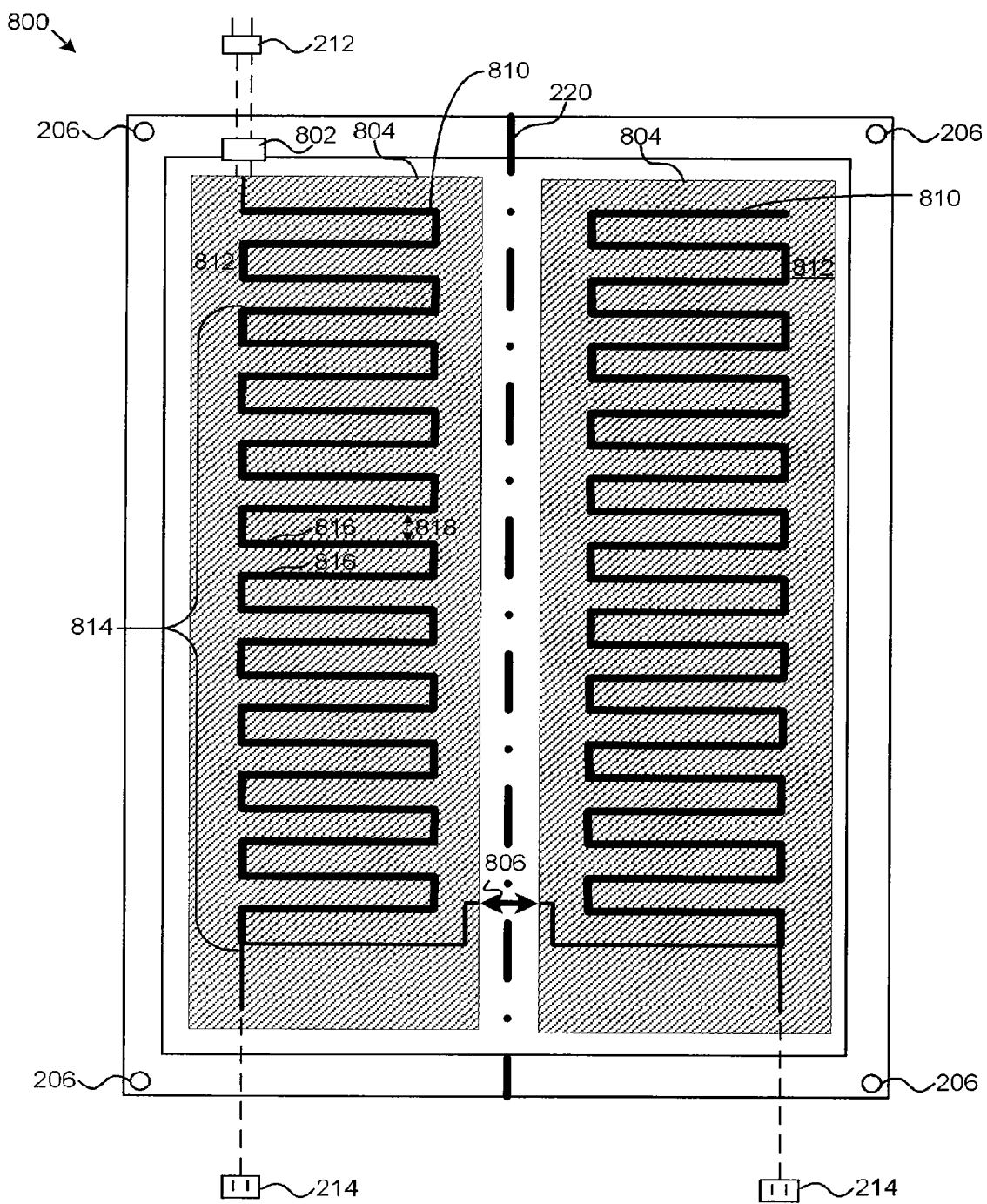
FIG. 8 is a schematic block diagram illustrating one embodiment of a modular heated cover with integrated electrical heating elements.

FIG. 8 illustrates another embodiment of a modular heated cover 800. In one embodiment, the thermal cover 800 includes the multilayered cover 200 comprising a single outer layer 307. However, this alternative embodiment includes one or more heat spreading layers 804. This embodiment additionally includes an electrical connection 802 for connecting the power plug 212 to an electrical heating element 810. Additionally, an electrical connection 806 may be included to connect multiple electrical heating elements 810 within a single cover 800. Additionally, the cover 800 may include power connectors 212, 214, power connections 216 (not shown in FIG. 8), fasteners 206, folding crease 220, and the like.

In one embodiment, the heat spreading layer 804 may comprise a thin layer of graphite 812, deposited on a structural substrate (not shown). A protective layer (not shown) may be applied to cover the layer of graphite 812. Of course layers 302 and 306 may serve, respectively, as a structural substrate and protective layer. The protective layer may adhere to, or be heat welded to, the substrate. In one embodiment, the graphite 812 may be deposited as flakes, or a graphite-epoxy composite that includes graphite flakes, on plastic, vinyl, rubber, metal foil, or the like. In one embodiment, the graphite element 812 may be integrated with a thermal insulation layer 304.

Preferably, the graphite 812 draws the heat out of the electrical heating element 810. Advantageously, the graphite 812, substrate, and protective layer are very thin and light weight.

In one embodiment, the graphite heat spreading layer 804 may be between about 3 and about 20 thousandths of an inch thick. Preferably, the graphite heat spreading layer 804 is about three feet wide and about twenty-three feet long and between about 1 thousandths of an inch thick and about 40 thousandths of an inch thick. In a more preferred embodiment, the graphite heat spreading layer 804 is about five thousandths of an inch thick. In certain embodiments, each segment of graphite heat spreading layer 804 has a surface area between ten square feet and 69 square feet. Preferably, two graphite heat spreading layers 804 cooperate in a single cover 800 to provide a combined surface area of between approximately ten square feet and approximately 253 square feet.

In certain embodiments, the graphite layer 812 may be between about 1 thousandths of an inch thick and about 40 thousandths of an inch thick. This range is preferred because within this thickness range the graphite layer 812 remains pliable and durable enough to withstand repeated rolling and unrolling as the cover 800 is unrolled for use and rolled up for storage.

The small size and thickness of the graphite layer 812 minimizes the weight of the cover 800. The electrical heating element 810 is preferably pliable such that the cover 800 can be rolled or folded lengthwise without breaking the electrical path. Advantageously, the electrical heating element 810 can be manufactured separately and provided for installation into a cover 800 during manufacturing of the covers 800.

For example, the electrical heating element 810 may come with electrical connections 806 and 802 directly from a supplier. The electrical heating element 810 may be secured on a bottom facing side of the graphite heat spreading layer 804. Alternatively, the electrical heating element 810 may be secured on a top facing side of the graphite heat spreading layer 804. The electrical connections 802 may be made to power connections 212 and one or more electric power couplings 214. One electrical heating element 810 may be connected to a second electrical heating element 810 by an electrical connection 806.

The electrical connection 806 serves as an electrical bridge joining the two electrical heating elements 810. Preferably, the electrical connection 806 also bridges a crease 220. The crease 220 facilitates folding the cover 800. Preferably, the crease 220 is positioned along the horizontal midpoint.

Finally, the remaining layers of thermal insulation 304 and outer cover 306 are laid over the top of the graphite heat spreading layer 804 in a manner similar to that illustrated in FIG. 3. Next, the perimeter of the cover 800 may be heat welded for form a water tight envelope for the internal layers. In addition, residual air between parts of an outer layer 307 may be extracted from between parts of the outer layer 307 such that heat produced by the cover 800 is more readily conducted toward the bottom cover 306.

It should be noted that in certain embodiments the thermal insulation 304 is a layer separate from the cover 800 and is added by a user during use of the cover 800. In one embodiment, a user lays insulation material such as straw, regular passive concrete blankets, or the like over embodiments of the cover 800 that do not include an internal thermal insulation layer 304.

In one embodiment, the electrical heating element 810 is laid out on the graphite heat spreading layer 804 according to a predetermined pattern 814. Those of skill in the art will recognize that a variety of patterns 814 may be used. Preferably, the pattern 814 is a zigzag pattern that maintains an electrical path and separates lengths 816 of the electrical heating element 810 by a predefined distance 818. Preferably, the distance 818 is selected such that a maximum amount of the resistance heat produced by a length 816 is conducted away from the length by the substrate, thermal insulation layer 304 and the like. In addition, the distance 818 is selected such that heat conducted from one length does not impede conducting of heat from a parallel length. In addition, the distance 818 is not so large that cool or cold spots are created. In an alternative embodiment, the lengths 816 run lengthwise with respect to the graphite heat spreading layer 804 as opposed to width-wise as illustrated in FIG. 8. Lengthwise lengths 816 may be organized in a pattern similar to that illustrated in FIGS. 2 and 7.

Preferably, the distance 818 is between about 10 inches and about twenty inches wide. Advantageously, this distance range 818 provides for even, consistent heat dissipation across the surface of the cover 800. The smaller the distance 818, the lower the possibility of cold spots in the cover 800. By minimizing cold spots, a consistent and even curing of concrete or thawing of ground can be accomplished.

The material for the resistive element 208 and/or electrical heating element 810 may be conventional materials such as copper, iron, and the like which have a positive temperature coefficient of resistance. Preferably, the resistive element 208 comprises a material having a negative temperature coefficient of resistance such as graphite, germanium, silicon, and the like. In rush current may be drawn when a cover 800 is initially connected to a power source 100 or when a second cover 800 is coupled to a first cover 800 connected to the power source 100. In embodiments in which the resistive element 208 and/or electrical heating element 810 use graphite, the in rush current is substantially minimized. Thus, the circuit may be designed to include up to the maximum current draw allowed by the circuit breaker.

In the embodiment illustrated in FIG. 8, the electrical heating element 810 and graphite heat spreading layer 804 cooperate to provide sufficient heat energy to maintain a temperature between 50 degrees Fahrenheit, and 90 degrees Fahrenheit beneath the cover, in freezing ambient conditions. Additionally, using such a configuration, it is possible to connect up to three modular thermal covers on a single 120 Volt power source protected by a single 20 Amp circuit. Thus, consistent heat may be provided for between about 300 to about 1000 square feet of surface on a single 20 Amp power source.

As indicated in the background above, the modular heated cover 200 provides a solution to the problem of accumulated snow, ice, and frost or frozen work surfaces in various construction, residential, industrial, manufacturing, maintenance, agriculture, and service fields.

Figure 9:
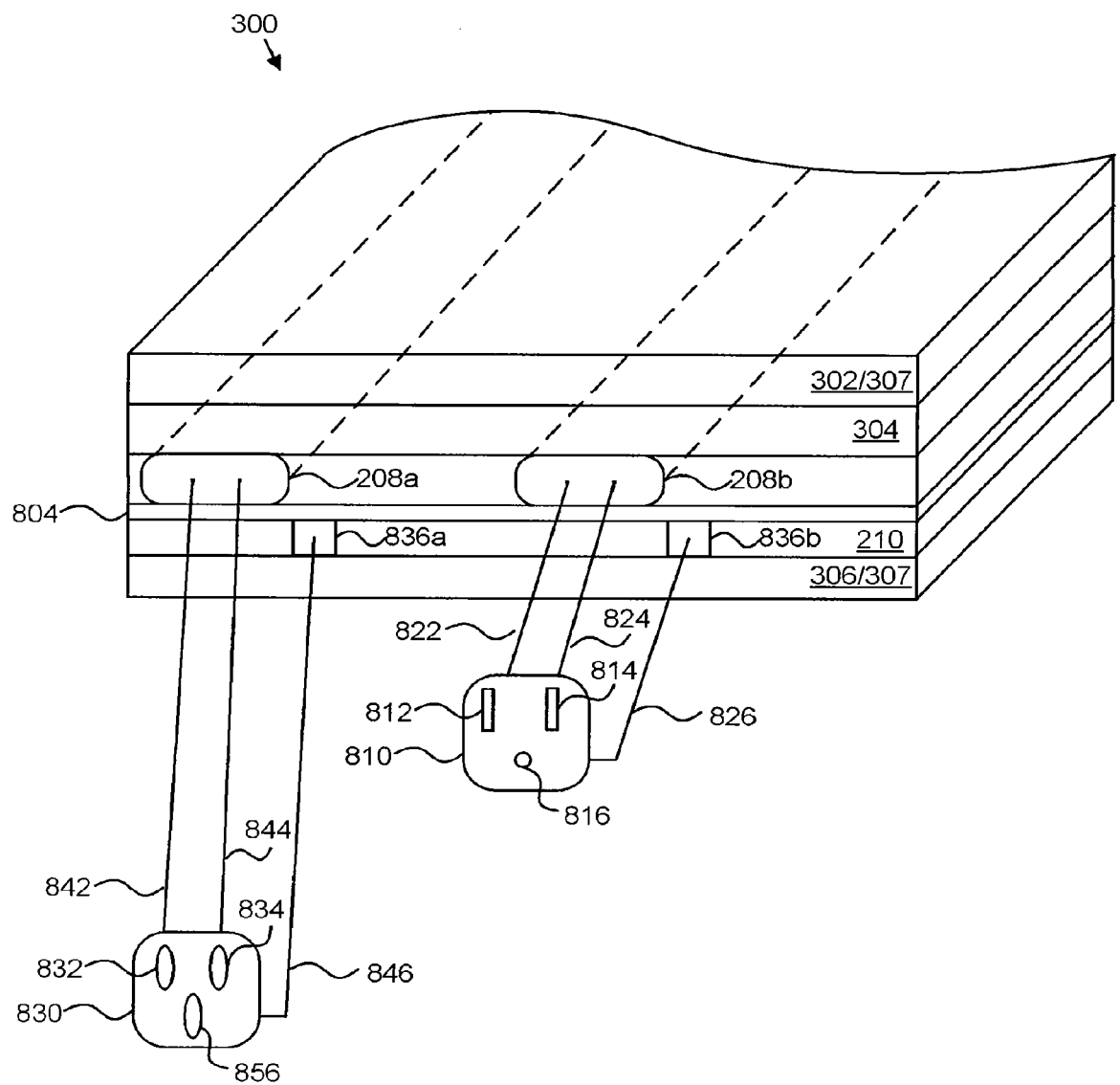
FIG. 9 is a schematic cross-sectional diagram illustrating one configuration for grounding a modular heated cover.

FIG. 9 is a schematic cross-sectional diagram illustrating one configuration for grounding a modular heated cover. In the depicted embodiment, the multilayer modular heated cover 300 comprises a first outer layer 302 and a second outer layer 306. As described above, in certain embodiments the first outer layer 302 and second outer layer 306 comprise a single outer layer 307. The multilayer modular heated cover 300 further comprises the thermal insulation layer 304 which provides thermal insulation to retain heat, as described above. The multilayer modular heated cover 300 additionally comprises a resistive element 208a-b, an electrically insulating element 804, ground coupling 836a-b, and heat-spreading element 210.

As described above, the resistive element 208a-b may comprise any material capable of conducting electricity and converting the electrical energy into heat energy. In a preferred embodiment, the heat is generated due to the resistance of the resistive element 208a-b to the flow of electrons, as is well-known by those of skill in the art.

The multilayer modular heated cover 300 further comprises an electrically insulating element 804. Electrically insulating element 804 is an element that ensures that the current flow through the resistive element 208a-b is isolated from the heat-spreading element 210 which, in the depicted embodiment, is an electrical conductor. Those of skill in the art will recognize that, while the depicted embodiment shows electrically insulating element 804 as a layer, a layer is simply one of many possible configurations. For example, the electrically insulating element 804 may be isolated to areas directly below the resistive element 208a-b and above the heat-spreading element 210. In other embodiments, the electrically insulating element 804 is part of a multi-layered electrical heating element such as a heat tape. Examples of materials suitable for use as an insulating element 804 include plastic, ceramic, polyethylene, silicon dioxide, Teflon, fish paper, and Biaxially-oriented polyethylene terephthalate (bo-PET). However, other materials known to those of skill in the art may be appropriate for use as an electrical insulator and may be used without departing from the essence of the present invention.

In one embodiment, an appropriate insulating element 804 forms a thin plastic layer on both sides of the heat-spreading element 210. The insulating element 804 may additionally provide structure to the heat-spreading material used in the heat spreading element 210. For example, the insulating element 804 may be polyethylene terephthalate (PET) in the form of a thin plastic layer applied to both sides of a heat-spreading element 210 comprising graphite. Those of skill in the art will appreciate that such a configuration may result in the insulating element 804 lending additional durability to the heat-spreading element 210 in addition to providing electrical insulation.

As a result of the electrically insulating element 804, the resistive element 208a-b is not in electric communication with the heat-spreading element 210. Those of skill in the art will recognize that the phrase 'not in electric communication' indicates that current does not flow with minimal impedance from one specified element to another, and is not meant to indicate that the elements are in complete electrical isolation from one another. For example, a current through the resistive element 208a-b may induce minor currents in the heat-spreading element 210 without being considered 'in electric communication' for purposes of the present invention.

In a preferred embodiment illustrated in FIG. 9, no additional layer is added to the cover 300 to facilitate grounding. As a result, the safety of the cover 300 is increased by providing grounding without a corresponding increase in cost or a corresponding decrease in the effectiveness of the cover due to greater weight and/or loss of flexibility. Advantageously, grounding is provided by using an existing component for two purposes. Specifically, the heat-spreading element 210 serves a thermal dissipation purpose as well as a ground purpose for the whole cover 300.

The multilayer modular heated cover 300 further comprises ground couplings 836a-b. The ground couplings 836a-b are attached to the electrically conductive heat-spreading element 210. In one embodiment, the ground couplings 836a-b are electrically connected to the heat-spreading element 210 in the plane of the heat-spreading element 210. Those of skill in the art will recognize that, in many embodiments, such as those in which graphite is used as the material for the heat-spreading element 210, the electrical resistivity of the material is less within the plane of the layer 210 and greater through the thickness of the layer. For example, the electrical resistivity along the plane may be on the order of milli-ohms ($\mu\Omega$) whereas the electrical resistivity through the thickness is on the order of micro-ohms ($m\Omega$). As such, in certain embodiments it is advantageous for the ground couplings 836a-b to be connected in the plane of the heat-spreading element 210.

In one embodiment, the ground couplings 836a-b comprise planar rectangular metal connection blades that would normally be used as the hot and/or neutral connection blades of a power coupling such as receiving power coupling 810 which connects to a power source. Those of skill in the art will recognize that a standard power coupling (whether a receiving power coupling 810 or a female power coupling 830) typically includes a wire, such as ground wire 826, that is intended to be connected to the device meant to be powered by the power coupling. However, an additional piece such as a ground coupling 836a-b is needed to secure the wire to the appropriate connection point. In one embodiment, a blade, as described above, is used as the ground couplings 836a-b in order to make the connection.

Where a blade is used as a ground coupling 836a-b, the blade is inserted such that it makes and maintains an electrical connection with the heat-spreading element 210. In certain embodiments, this entails inserting the blade through an opening in the outer layer 302/307 and through the thermal insulating element 304. The blade is further configured such that it does not make contact with the resistive element 208a-b. In one embodiment, the blade further comprises barbs configured to cut into the heat-spreading element 210 and engage the heat-spreading element 210 such that the blade does not come loose. In alternative embodiments, the blade may be connected to the heat-spreading element 210 with an adhesive that does not electrically insulate the heat-spreading element 210 from the blade. In addition, the plane of the blade may be placed parallel to the plane of the heat-spreading element 210 such that a maximum amount of the surface area of the blade is in direct contact with the heat-spreading element 210. Those of skill in the art will recognize that such a configuration increases the contact area between the two surfaces and results in a better electrical and physical connection. Furthermore, such a configuration leverages the lower in-plane resistivity of the heat-spreading element 210.

Other embodiments may be implemented where crimp-on or other connectors may be used. For example, in one embodiment AMP/TYCO part number 52195 available from Tyco Electronics of Berwyn, Pa. includes barbs that can pierce the heat-spreading element to make electrical contact with the heat-spreading element 210 to accomplish appropriate grounding.

Additionally, foil tape can be applied around the area where a grounding coupling 836 is used to provide for rigidity or additional strength. This may be particularly useful when a slit is formed in the heat-spreading element 210 to allow a crimp coupling, such as the 52195 to be attached to the heat-spreading element 210.

Notably, heated covers can be daisy chained such that power can be provided from one heated cover 300 to another heated cover 300. For example, the receiving power coupling 830 of a first heated cover 300 can be connected to a female electric power coupling 810 of a second heated cover 300 to obtain power for heating the second heated cover 300. In accordance with these principles, the ground path between the heated covers 300 may be through the heat-spreading element 210. In particular, as illustrated at 836(*b*), a ground connection may be supplied to a second heated cover by connecting to the heat-spreading element 210.

A pliable heating element is an apparatus for heating by converting electrical energy to heat energy. The pliable heating element is one of the components of a grounded modular heated cover. As discussed above, the combination of the resistive element 208*a-b*, heat spreading element 210, and electrically insulating element 804 as depicted in FIG. 9 may constitute elements of a pliable electrical heating element.

In the depicted embodiment, the multilayer modular heated cover 300 further comprises a receiving power coupling 810 and a female electric power coupling 830. Examples of receiving power coupling 810 include 120V plug connectors 702 and 240V power connector 704. The receiving power coupling 810 is configured to be connected to a power source (whether 120V or 240V) in order to provide the electrical energy necessary to power the resistive element 208*a-b*. As taught above, the receiving power coupling 810 may be connected to the female electric power coupling 830 of a different grounded modular heated cover such that the second cover draws power through the first heated cover sufficient to power both blankets. Such a configuration is illustrated and discussed further in FIG. 11.

The receiving power coupling 810 further comprises a hot prong 812, a neutral prong 814, and a grounding prong 816. As known by those of skill in the art, in a standard North American power source (such as wall socket 1102 shown in FIG. 11), the left slot is neutral, the right is hot, and the bottom is ground. The prongs 812, 814, and 816 are configured to be coupled with the associated hot, neutral, and ground of a standard power source socket. However, configurations of the position of the hot, neutral, and grounding connections differ around the world. In addition, the shape of the prongs on a receiving power coupling 810 and the couplers on a female power coupling 830 may also vary based on the standards of a particular geographical region. There may additionally be changes in the voltages, frequencies, or other power characteristics of a power supply in different regions. However, such variations are well known to those in the art. The present invention may be implemented with a variety of possible configurations wherein the grounded modular heated cover is tailored to a different region with different electrical and power standards without departing from the invention.

The hot prong 812 and neutral prong 814 of the receiving power coupling 810 are connected to the resistive element 208*a-b* circuit such that the resistive element 208*a-b* is able to utilize the power made available by a power source to which the receiving power coupling 810 is connected. Methods for providing such a connection are well known to those of skill in the art. In the depicted embodiment, the hot prong 812 is connected to the resistive element 208*a-b* through a hot wire 822 and the neutral prong 814 is connected to the resistive element 208*a-b* through a neutral wire 824.

In contrast, the grounding prong 816 is connected by the ground wire 826 to the ground couplings 836*a-b*. In a preferred embodiment, the grounding prong 816 and the associated ground couplings 836*a-b* and heat-spreading element 210 do not carry current from the power source during normal operation of the resistive element 208*a-b* circuit. Those of skill in the art will further appreciate that a power source typically provides a grounding system sufficient to act as a proper ground for a device properly connected through a grounding pin 816. Instead, the grounding prong 816 and the associated ground couplings 836*a-b* and heat-spreading element 210 serve a safety function.

The multilayer modular heated cover 300 further comprises a female electric power coupling 830. The female electric power coupling 830 further comprises a neutral coupler 832, a hot coupler 834, and a ground coupler 856. The female electric power coupling 830 is configured to receive a male electric power coupling such as receiving power coupling 810. As such, the female electric power coupling 830 may be used to connect one grounded modular heated cover to a second grounded modular heated cover by connecting a receiving power coupling 810 of the first cover to the female electric power coupling 830 of the second cover.

Similar to the receiving power coupling 810, the hot coupler 834 and neutral coupler 832 are connected respectively by hot wire 842 and neutral wire 832 to the resistive element 208*a-b* such that a cover connected by the female electric power coupling 830 becomes part of the circuit. Those of skill in the art will appreciate that a person could connect the receiving power coupling of other apparatus to the female electric power coupling 830 such that the apparatus would constitute part of the electric circuit.

Figure 10:
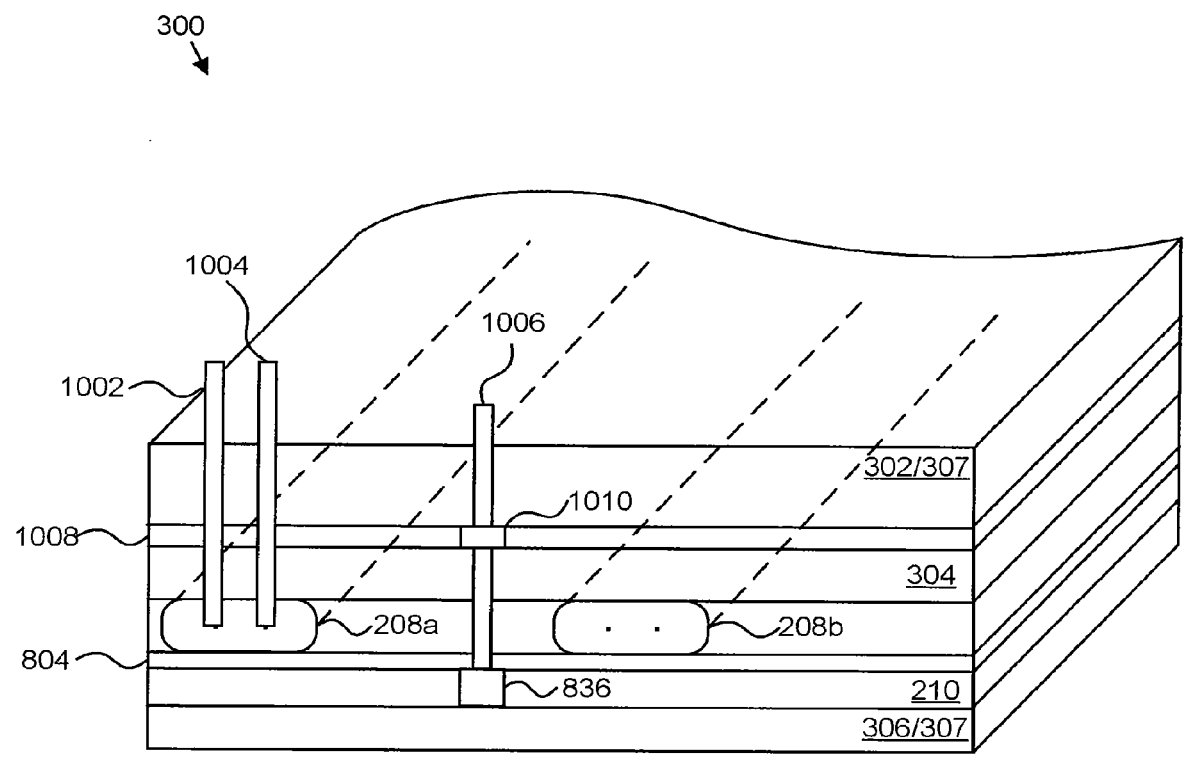
FIG. 10 is a schematic block diagram illustrating an alternative configuration comprising a grounding layer for grounding a modular heat cover.

FIG. 10 is a schematic block diagram illustrating an alternative configuration comprising a grounding layer for grounding a modular heat cover. In addition to items depicted in FIG. 9, the multilayer modular heated cover 300 further comprises a grounding layer 1008, grounding layer coupling 1010, grounding connection 1006, hot connection 1002, and neutral connection 1004. While the depicted embodiment does include an additional grounding layer 1008, increasing the weight and cost of manufacture, the inclusion of the additional grounding layer 1008 may provide an added level of safety by positioning the current-carrying element (such as resistive element 208) between the grounding layer 1008 and the heat-spreading element 210. In such an embodiment, greater safety results by grounding both the grounding layer 1008 and the heat-spreading element 210 to a common ground. Grounding only the grounding layer 1008 does not provide an additional safety benefit over the embodiment described in FIG. 9 and carries the costs of increased weight and increase manufacturing costs.

Grounding layer 1008 comprises a layer of electrically-conductive material with sufficiently low resistance to provide a connection to ground through the grounding layer coupling 1010, grounding connection 1006, and, ultimately, the ground of the power source. In one embodiment, the grounding layer 1008 may be foil. Alternatively, the grounding layer 1006 may be a layer of graphite or other carbon-based material. In one embodiment, the grounding layer 1008 is disposed in the multilayer modular heated cover 300 such that the resistive element 208*a-b* is between the grounding layer 1008 and the electrically-conductive heat spreading layer 210.

In such an embodiment, the heat spreading layer 210 is connected to ground in a fashion similar to that depicted and explained in FIG. 9. While the embodiment depicted in FIG. 10 illustrates the heat-spreading layer 836 and grounding layer 1008 connected to ground through a common grounding connection 1006, those of skill in the art will appreciate that the two may share a different grounding connection 1006 through the multilayer modular heated cover 300 and come to a common grounding prong 816 such that the grounding layer 1008 and heat-spreading element 210 share a common ground. Alternatively, either the grounding layer 1008 or the heat-spreading element 210 may be grounded to a power source ground lead.

Those of skill in the art will appreciate that such a configuration may offer additional safety benefits by increasing the likelihood that, should a problem arise which may result in a person coming into contact with a current-carrying element of the multilayer modular heated cover 300 (such as the resistive element 208a-b), the current-carrying elements are 'sandwiched' between the grounding layer 1008 and heat-spreading element 210. As a result, it is more likely that the current-carrying elements will come into contact with ground before a connection is made with a person, thus avoiding a potentially hazardous situation.

In one embodiment, the grounding layer 1008 is situated such that the thermal insulating element 304 is between the grounding layer 1008 and the resistive element 208a-b. Such a configuration reduces the heat absorption by the grounding layer 1008, increasing the heat transferred to the heat-spreading element 210.

Figure 11:
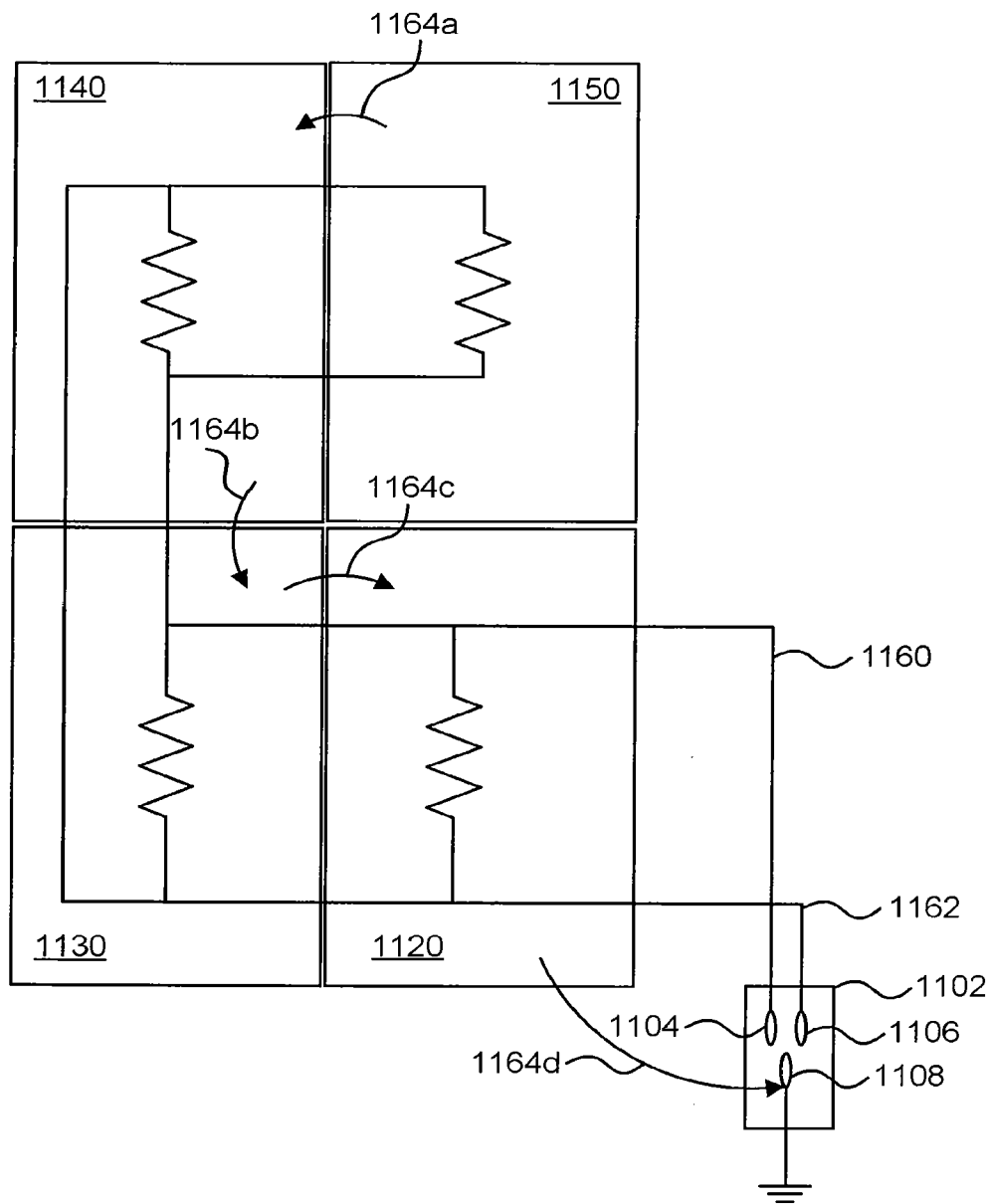
FIG. 11 is a schematic block diagram illustrating an exemplary embodiment of a grounding connection for a system comprising a plurality of modular heated covers.

FIG. 11 is a schematic block diagram illustrating an exemplary embodiment of a grounding connection for a system comprising a plurality of modular heated covers. The system comprises grounded modular heated covers 1120, 1130, 1140, and 1150. The system further comprises a power source 1102. In one embodiment, the depicted power source 1102 is a standard 120V wall socket. The power source 1102 further comprises a hot slot 1106, neutral slot 1104, and a grounding slot 1108. As depicted, the grounding slot 1108 constitutes a connection to the ground (such as an earth electrode) of the power source.

FIG. 11 further depicts a hot rail 1162 and a neutral rail 1160. As is known to those in the art, the rails 1162 and 1160 are the electrical connections from the power source 1102 to the grounded modular heater covers 1120, 1130, 1140, 1150. In one embodiment, the connection is made as depicted and described in connection to FIGS. 6-9. For ease of explanation, the connections are modeled as rails 1160 and 1162, and each of the covers 1120, 1130, 1140, and 1150 is modeled as a resistor. As known to those of skill in the art, the depicted embodiment represents a parallel circuit configuration.

FIG. 11 further depicts a ground connection 1164a-d. As shown and described in FIG. 9, ground connections 1164a-d may be made by way of the female electric power coupling 830 of a cover and the receiving power coupling 810 of a second cover. For example, the cover 1150 is attached through the cover 1150's receiving power coupling 810 to the female electric power coupling 830 of the cover 1140. This connection puts the cover 1150 electrically in parallel with the cover 1140, as depicted. Those of skill in the art will recognize that this depiction is representative of one possible configuration, and is not a limitation on how the connections may be made. For example, the grounded modular heated covers may be wired such that a connection of multiple covers forms a series electrical connection as opposed to a parallel connection.

In addition, the grounding prong 816 of the cover 1150's receiving power coupling 810 is electrically connected to the heat-spreading element 210 of the cover 1150 by the ground coupling 836. The grounding coupler 856 of the cover 1140's female electric power coupling 830 is electrically connected to the heat-spreading element 210 of the second cover 1140. The electrical connection between the two heat-spreading elements 210 is depicted by ground connection 1164a. A connection is similarly made between all of the system components, as depicted by ground connections 1164b (linking 1140 and 1130), 1164c (linking 1130 and 1120) and 1164d (linking 1120 to the grounding slot 1108 of the power source 1102. As a result, the ground connections form a series electrical 'chain' from the furthest element (1150) to the source (1102).

As appreciated by those of skill in the art, the ground connection 1164a is not a normal part of the operation of the circuit. As such, absent a failure within one of the modular covers 1150, 1140, 1130, of 1120, the grounding connections 1164a-d do not play an active role. However, if a fault occurs in any of the covers 1120, 1130, 1140, or 1150 such that a connection is established between, for example, the hot rail 1162 and the heat-spreading element 210 of any cover, the grounding connections 1164a-d become an active part of the circuit, drawing the current from the hot rail 1102 to the grounding slot 1108. Such a configuration provides an added measure of safety as it ensures that the current follows the low-resistance path to ground (grounding path 1164a-d) instead of taking a path through an individual using the covers. Further, it is common for power sources 1102 to comprise a breaker or other sensor such that the return current flow through the grounding path 1164a-d triggers safety systems that will turn off the power supplied through the hot rail 1102.

For example, if a fault occurs in cover 1140 such that a connection is established from the hot rail 1102 to the heat-spreading element 210 of cover 1140, the grounding connections 1164b-d provide a path for the current such that it flows: from the hot rail 102 through the grounding connection 1164b to the heat-spreading element 210 of cover 1130, then to the heat-spreading element 210 of cover 1120 through grounding connection 164c, and finally to the power source ground (grounding slot 1108) through the grounding connection 1164d.

Figure 12:
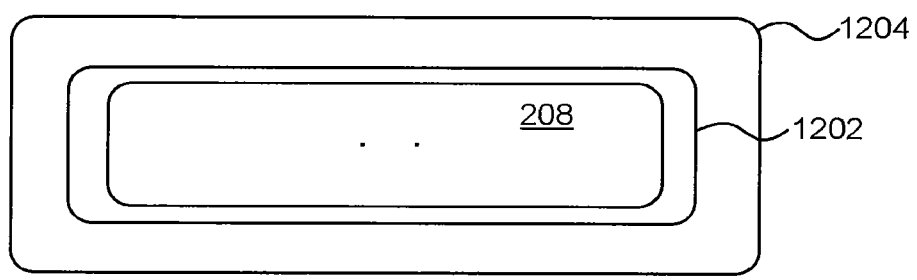
FIG. 12 is a schematic block diagram illustrating an alternative configuration comprising a grounding sheath for grounding a modular heat cover.

FIG. 12 is a schematic block diagram illustrating an alternative configuration comprising a grounding sheath 1204 for grounding a modular heat cover. In the depicted embodiment, the resistive element 208 is encompassed by a grounding sheath 1204. The grounding sheath 1204 is electrically connected to the grounding prong 816 of a receiving power coupling 810. Similarly, the grounding sheath 1204 may be connected to the grounding coupler 856 of a related female electric power coupling 830. Similar to that shown and discussed in FIG. 9, by making the above electrical connections the grounding sheath 1204 is in electrical communication with the ground of the driving power source. In one embodiment, the sheath 1204 may be made of electrically-conductive material such as copper or graphite. In one embodiment, the sheath may be made of a material such as carbon fiber which has high electrical conductivity and low thermal conductivity such that the sheath 1204 acts as an adequate ground but absorbs minimal heat from the resistive element 208. Alternatively, the sheath 1204 may be made of a material with both high electrical conductivity and high thermal conductivity such as copper, such that the sheath 1204 absorbs the heat generated by the resistive element 208 and acts as if it were the source of the heat. Thus, the heat would transfer from the sheath 1204 to the heat-spreading element 210. In a preferred embodiment, the sheath 1204 is electrically insulated from the heat-spreading element 210 if the heat-spreading element 210 is an electrical conductor.

The embodiment in FIG. 12 further comprises an electrically insulating sheath 1202. The electrically insulating sheath 1202 ensures that the current in the resistive element 208 does not flow through the grounding sheath 1204. Examples of materials suitable for use as an electrically insulating sheath 1202 include polyethylene, silicon dioxide, Teflon, fish paper, and Biaxially-oriented polyethylene terephthalate (boPET). However, other materials known to those of skill in the art may be appropriate for use as an electrical insulator and may be used without departing from the essence of the present invention.

The grounding sheath 1204 may be formed as a single unitary piece containing the resistive element 208. The grounding sheath 1204 may also be a made of a number of pieces of appropriate material configured to encompass the resistive element 208 as shown in FIG. 12. For example, the grounding sheath 1204 may be a sheet of material folded around the resistive element 208 to form the depicted encompassing enclosure. Alternatively, the grounding sheath 1204 may be made of material braided together to form the enclosure depicted in FIG. 12. The insulating sheath 1202 may be similarly formed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A heating unit comprising:
   a first outer layer having a first side and a second side, the first side being exposed to define a first outer surface of the heating unit;
   a second outer layer having a first side and a second side, the first side being exposed to define a second outer surface of the heating unit;
   a heating element disposed between the first and second outer layers, the heating element comprising:
      a heat generating element for generating heat energy; and
      a heat spreading element positioned adjacent the heat generating element and in at least partially direct contact with the second side of the second outer layer, the heat spreading element comprising a contiguous laminate sheet of carbon, the contiguous laminate sheet of carbon being thermally coupled to and electrically insulated from the heat generating element and being configured to uniformly distribute the heat energy generated by the heat generating element over a surface of the heating unit; and
   a thermal insulation layer positioned between the heating element and the first outer layer to direct the heat energy toward the second outer layer, a first side of the thermal insulation layer being in at least partially direct contact with the second side of the first outer layer and a second side of the thermal insulation layer being in at least partially direct contact with the heating element.

2. The heating unit of claim 1, wherein the first or second outer layer comprises burlap, canvas, cotton, nylon, or vinyl.

3. The heating unit of claim 1, wherein the thermal insulation layer comprises polystyrene, cotton, poly-tetra-fluoro-ethylene, or fiberglass.

4. The heating unit of claim 1, wherein the heat spreading element comprises graphite.

5. The heating unit of claim 1, wherein the first and second outer layers are sealed together to form a water resistant envelope around the thermal insulation layer and electrical heating element.

6. The heating unit of claim 1, wherein the heat generating element comprises a resistive element adapted to convert electrical energy to heat energy.

7. The heating unit of claim 6, wherein the heat generating element is coupled to a receiving power connector, the receiving power connector configured to couple to an electrical power source to supply electrical energy to the heat generating element.

8. The heating unit of claim 1, wherein the heat generating element is thermally coupled to the heat spreading element.

9. The heating unit of claim 1, wherein the heat generating element is positioned between the heat spreading element and the thermal insulation layer.

10. The heating unit of claim 1, wherein the heating unit is adapted to uniformly heat a surface adjacent the second outer layer.

11. A heating unit comprising:
    a heat generating element coupleable to an electrical power source to supply electrical energy to the heat generating element, the heat generating element being adapted to convert the electrical energy to heat energy;
    a heat spreading element, the electrical heat generating element being attached to a first side of the heat spreading element, the heat spreading element comprising a contiguous laminate sheet of carbon thermally coupled to and electrically insulated from the heat generating element and being configured to uniformly distribute the heat energy generated by the heat generating element over a surface adjacent thereto; and
    a thermal insulation layer positioned adjacent to and in at least partially direct contact with the electrical heat generating element and the first side of the heat spreading element to direct the heat energy toward a second side of the heat spreading element.

12. The heating unit of claim 11, further comprising first and second cover layers to enclose the heat generating element, the heat spreading element, and the thermal insulation layer.

13. The heating unit of claim 12, wherein the first cover layer is adapted to absorb heat energy from an external environment.

14. The heating unit of claim 12, wherein the second cover layer is adapted to convey heat energy to an external environment.

15. The heating unit of claim 12, wherein the first cover layer has a first side and a second side, the first side being exposed to define a first outer surface of the heating unit, and the second side being in at least partially direct contact with the thermal insulation layer.

16. The heating unit of claim 15, wherein the second cover layer has a first side and a second side, the first side being exposed to define a second outer surface of the heating unit, and the second side being in at least partially direct contact with the heat spreading element.

17. The heating unit of claim 11, wherein the heating unit is adapted to transfer heat energy to a surface adjacent the second side of the heat spreading element.

18. The heating unit of claim 17, wherein the heating unit is adapted to heat and maintain the surface to temperatures between 50° F. and 90° F.

19. The heating unit of claim 18, further comprising a thermostat to enable selective adjustment of the temperature.

20. The heating unit of claim 11, wherein the heat spreading element comprises graphite.

21. A heating unit for uniformly transferring heat energy to a surface or object, the heating unit comprising:
    a first cover layer and a second cover layer that are attached together to form an enclosed interior portion therebetween, wherein:
       the first cover layer has a first side and a second side, the first side being exposed to define a first outer surface of the heating unit and the second side facing the enclosed interior portion; and the second cover layer has a first side and a second side, the first side being exposed to define a second outer surface of the heating unit and the second side facing the enclosed interior portion;

an electrical heating element enclosed within the interior portion formed by the first and second cover layers, the electrical heating element comprising:

a heat generating element adapted to convert electrical energy to heat energy; and a planar heat spreading element positioned adjacent to and electrically insulated from the heat generating element, the electrical heat generating element being thermally coupled to the heat spreading element to facilitate transfer of the heat energy from the heat generating element to the heat spreading element, the heat spreading element comprising a contiguous laminate sheet of graphite, the heat spreading element being in at least partially direct contact with the second surface of the second cover layer and being configured to uniformly distribute the heat energy to a surface or object adjacent the first surface of the second cover layer; and a thermal insulation layer enclosed within the interior portion formed by the first and second cover layers, the thermal insulation layer being positioned between and in at least partially direct contact with both the second surface of the first cover layer and the electrical heating element, the thermal insulation layer being adapted to direct the heat energy toward the second cover layer;

one or more fasteners disposed in the first or second cover layers to enable the heating unit to be secured on, around, or to a surface or object; and a receiving power connector electrically connected to the heat generating element, the receiving power connector configured to couple to an electrical power source to supply electrical energy to the heat generating element.

22. The heating unit of claim 21, further comprising an outgoing electrical connector electrically coupled to the receiving power connector, the outgoing electrical connector being configured to couple to receiving power connectors of other heating units.

23. The heating unit of claim 21, wherein the heating unit is adapted to be rolled or folded.

24. A heating unit for uniformly transferring heat energy to a surface or object, the heating unit comprising:

a first cover layer and a second cover layer, wherein edges of the first cover layer are attached to edges of the second cover layer to form an enclosed interior portion between the first and second cover layers, wherein:

the first cover layer has a first side and a second side, the first side being exposed to define a first outer surface of the heating unit and the second side facing the enclosed interior portion; and the second cover layer has a first side and a second side, the first side being exposed to define a second outer surface of the heating unit and the second side facing the enclosed interior portion;

an electrical heating element enclosed within the interior portion formed by the first and second cover layers, the electrical heating element comprising:

a heat generating element adapted to convert electrical energy to heat energy; and a planar heat spreading element, the heat generating element being attached to a first side of the heat spreading element, the heat generating element and the heat spreading element being electrically insulated from one another, the heat generating element being thermally coupled to the heat spreading element to facilitate transfer of the heat energy from the heat generating element to the heat spreading element, the heat spreading element comprising a contiguous laminate sheet of graphite, the heat spreading element being in at least partially direct contact with the second surface of the second cover layer and being configured to uniformly distribute the heat energy to a surface or object adjacent the first surface of the second cover layer; and a thermal insulation layer enclosed within the interior portion formed by the first and second cover layers, the thermal insulation layer being positioned between and in at least partially direct contact with each of the second surface of the first cover layer, the electrical heat generating element, and the first side of the heat spreading element, the thermal insulation layer being adapted to direct the heat energy toward the second cover layer;

one or more insulation flaps disposed about the periphery of the heating unit, the insulation flaps being adapted to maintain the heat energy between the heating unit and the surface or object being heated;

one or more fasteners disposed in the first cover layer, the second cover layer, or the one or more insulation flaps to enable the heating unit to be secured on, around, or to a surface or object;

a receiving power connector electrically connected to the heat generating element, the receiving power connector configured to couple to an electrical power source to supply electrical energy to the heat generating element; and an outgoing electrical connector electrically coupled to the receiving power connector, the outgoing electrical connector being configured to couple to receiving power connectors of other heating units.

25. The heating unit of claim 24, wherein the one or more fasteners comprise grommets.

26. The heating unit of claim 24, wherein the one or more fasteners comprise permanent attachment of one portion of the heating unit to an opposing portion of the heating unit such that the heating unit permanently maintains a wrapped shape.

27. The heating unit of claim 24, wherein the one or more fasteners comprise snaps with mating portions of the snaps disposed on opposing portions of the heating unit.

28. The heating unit of claim 24, wherein the one or more insulation flaps are formed by the first and second cover layers.

29. The heating unit of claim 1, wherein the thermal insulation layer is in at least partially direct contact with both the heat generating element and the heat spreading element of the heating element.

* * * * *